US011531568B2

(12) United States Patent
Al-Turki et al.

(10) Patent No.: US 11,531,568 B2
(45) Date of Patent: *Dec. 20, 2022

(54) TIME-AWARE APPLICATION TASK SCHEDULING SYSTEM

(71) Applicant: King Abdulaziz University, Jeddah (SA)

(72) Inventors: Yusuf Al-Turki, Jeddah (SA); Haitao Yuan, Jeddah (SA); Jing Bi, Jeddah (SA); Mengchu Zhou, Jeddah (SA); Ahmed Chiheb Ammari, Jeddah (SA); Abdullah Abusorrah, Jeddah (SA); Khaled Sadraoui, Jeddah (SA)

(73) Assignee: King Abdulaziz University, Jeddah (SA)

( * ) Notice: Subject to any disclaimer, the term of this patent is extended or adjusted under 35 U.S.C. 154(b) by 246 days.

This patent is subject to a terminal disclaimer.

(21) Appl. No.: 17/036,513

(22) Filed: Sep. 29, 2020

(65) Prior Publication Data
US 2021/0026690 A1    Jan. 28, 2021

Related U.S. Application Data

(63) Continuation of application No. 15/591,370, filed on May 10, 2017, now Pat. No. 10,871,993.

(51) Int. Cl.
*G06F 9/48*   (2006.01)
*G06F 1/3228*   (2019.01)

(52) U.S. Cl.
CPC .......... *G06F 9/4887* (2013.01); *G06F 1/3228* (2013.01)

(58) Field of Classification Search
CPC .......................... G06F 9/4887; G06F 1/3228
See application file for complete search history.

(56) References Cited

U.S. PATENT DOCUMENTS 10,120,721 B2 * 11/2018 Ramaswamy ........ G06F 9/5038
2008/0189575 A1    8/2008 Miguelanez
(Continued)

OTHER PUBLICATIONS

Kumar et al. "Optimized Particle Swarm Optimization Based Deadline Constrained Task Scheduling in Hybrid Cloud." ICTACT Journal on Soft Computing 6.2, pp. 1117-1122 (Year: 2016).*
(Continued)

*Primary Examiner* — Meng Ai T An
*Assistant Examiner* — Willy W Huaracha
(74) *Attorney, Agent, or Firm* — Oblon, McClelland, Maier & Neustadt, L.L.P.

(57) ABSTRACT

A time-aware application task scheduling system for a green data center (GDC) that includes a task scheduling processor coupled to one or more queue processors and an energy collecting processor connected to one or more renewable energy sources and a grid power source. The systems is capable of determining a service rate for a plurality of servers to process a plurality of application tasks in the GDC and scheduling, via processing circuitry, one or more of the application tasks to be executed in one or more of the servers at a rate according to a difference in an accumulated arriving rate for the plurality of application tasks into the one or more queues and a removal rate for the plurality of application tasks from the one or more queues. The system is further capable of removing the one or more application tasks from their associated queues for execution in the scheduled one or more servers.

7 Claims, 21 Drawing Sheets

(56) References Cited

U.S. PATENT DOCUMENTS

| | | |
|---|---|---|
| 2010/0205122 A1 | 8/2010 | Abramson |
| 2010/0229131 A1 | 9/2010 | Cases |
| 2012/0109705 A1 | 5/2012 | Belady et al. |
| 2012/0130554 A1 | 5/2012 | Jain et al. |
| 2012/0284730 A1 | 11/2012 | DeCusatis et al. |
| 2018/0136976 A1 | 5/2018 | Ammari |
| 2019/0286484 A1* | 9/2019 | Meirosu .............. G06F 9/4887 |

OTHER PUBLICATIONS

Yuan, Haitao, et al. "Time-aware multi-application task scheduling with guaranteed delay constraints in green data center." IEEE Transactions on Automation Science and Engineering 15.3 (, pp. 1138-1151. (Year: 2017).*

Ghamkhari et al.. "Energy and performance management of green data centers: A profit maximization approach." IEEE transactions on Smart Grid 4.2, pp. 1017-1025. (Year: 2013).*

Et al.. "Cloud task scheduling based on chaotic particle swarm optimization algorithm." 2016 International Conference on Intelligent Transportation, Big Data & Smart City (ICITBS). IEEE, pp. 493-496. (Year: 2016).*

Huangxin Wang et al., "On Time-Sensitive Revenue Management and Energy Scheduling in Green Data Centers," Apr. 21, 2014. https://arxiv.org/pdf/1404.4865.pdf.

Luna Mingyi Zhang et al., "Energy-efficient task scheduling algorithms on heterogeneous computers with continuous and discrete speeds," Sustainable Computing: Informatics and Systems, 2013, vol. 3, pp. 109-118.

Abusfian Elgelany Ibrahim Ahmed, "Integrated Framework for Green ICT: Energy Efficiency by Using Effective Metric and Efficient Techniques for Green Data Centers," Apr. 2015, pp. 1-131.

Yingqiu et al. "Cloud task scheduling based on chaotic particle swarm optimization algorithm" Dec. 2016, International Conference on Intelligent Transportation, Big Data & Smart City (ICITBS), pp. 493-496, IEEE. (Year: 2016).

Ghamkhari et al. "Energy and performance management of green data centers: A profit maximization approach." 2013, IEEE Transactions on Smart Grid 4.2, pp. 1017-1025. (Year: 2013).

Yuan et al. "Time-aware multi-application task scheduling with guaranteed delay constraints in green data center". 2017, IEEE Transactions on Automation Science and Engineering, 15(3), 1138-1151. (Year: 2017).

Shieh, Horng-Lin, Cheng-Chien Kuo, and Chin-Ming Chiang. "Modified particle swarm optimization algorithm with simulated annealing behavior and its numerical verification." Applied Mathematics and Computation 218.8 (2011): 4365-4383. (Year: 2011).

* cited by examiner

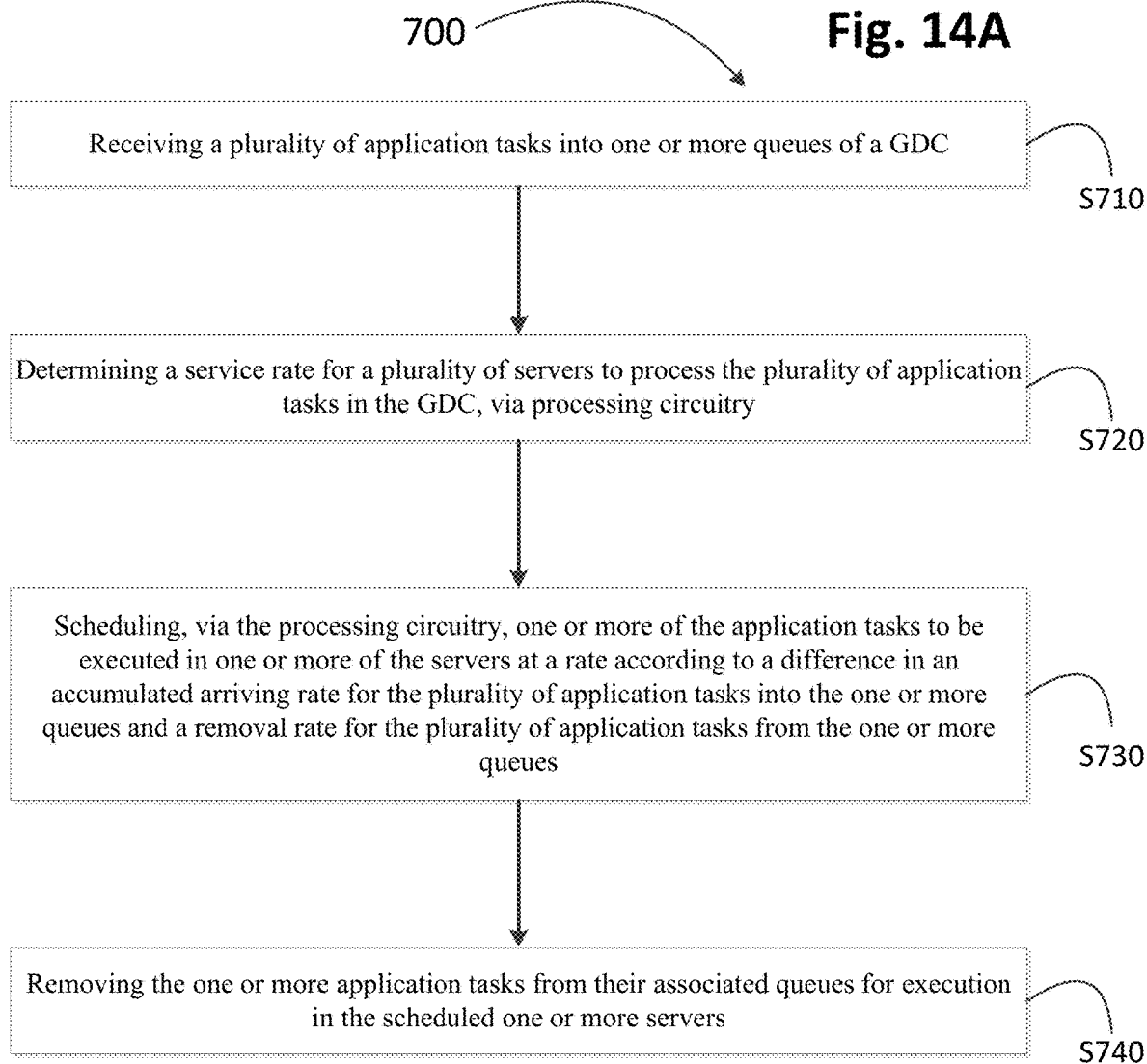

TIME-AWARE APPLICATION TASK SCHEDULING SYSTEM

CROSS-REFERENCE TO RELATED APPLICATIONS

The present application is a Continuation of Ser. No. 15/591,370, pending, having a filing date of May 10, 2017.

BACKGROUND

Field of the Disclosure

The present disclosure relates to managing incoming application tasks in a computing data center. In particular, renewable resources are incorporated into a green data center.

Description of Related Art

Infrastructure in a cloud computing scheme typically includes millions of physical servers and cooling facilities, which allows global users the flexibility to use these resources. See R. Buyya, K. Ramamohanarao, C. Leckie, R. N. Calheiros, A. V. Dastjerdi, and S. Versteeg, "Big data analytics-enhanced cloud computing: Challenges, architectural elements, and future directions," in *Proc.* 2015*IEEE 21st International Conference on Parallel and Distributed Systems*, 2015, pp. 75-84, incorporated herein by reference in its entirety. An increasing number of applications, such as scientific computing, high-performance simulation, and big data processing run cost-effectively in such an infrastructure. See A. N. Toosi, K. Vanmechelen, K. Ramamohanarao, and R. Buyya, "Revenue maximization with optimal capacity control in infrastructure as a service cloud markets," *IEEE Transactions on Cloud Computing*, vol. 3, no. 3, pp. 261-274, July 2015, incorporated herein by reference in its entirety. This significantly increases the consumption of electric energy in green clouds in recent years.

The electricity consumption of data centers in the United States was about 70 billion kilowatt-hours in 2014. This represents two percent of the total energy consumption in the US. It is expected that the total energy consumption of data centers in the U.S. will continue to increase another four percent by 2020. In the U.S., the electricity generated from burning coal accounts for more than fifty-seven percent. As a result, this brown energy consumption brings irreversible damages to the global environment. To reduce the carbon footprint, more green data centers (GDCs) deploy renewable energy facilities to decrease brown energy consumption.

A GDC typically attempts to schedule all arriving tasks cost effectively, while their required delay constraints are satisfied. Yuan, et al. consider tasks of multiple applications that have long delay constraints, such as massive-scale data processing and analysis. See H. Yuan, J. Bi, W. Tan, M. Zhou, B. H. Li, and J. Li, "TTSA: An effective scheduling approach for delay bounded tasks in hybrid clouds," to appear in *IEEE Transactions on Cybernetics*, doi: 10.1109/TCYB.2016.2574766, 2016; and D. Ruta, L. Cen, and E. Damiani, "Fast summarization and anonymization of multivariate big time series," in *Proc.* 2015 *IEEE International Conference on Big Data*, 2015, pp. 1901-1904, each incorporated herein by reference in their entirety. In a real-time cloud, the revenue, price of a grid, solar irradiance, and wind speed all vary with time. Thus, the temporal variation in the above factors makes it challenging to achieve profit maximization for a GDC, while strictly satisfying any delay constraint of an admitted task.

A lot of existing efforts have been made to manage energy consumption of a GDC by selectively scheduling tasks. See J. Luo, L. Rao, and X. Liu, "Spatio-temporal load balancing for energy cost optimization in distributed Internet data centers," *IEEE Transactions on Cloud Computing*, vol. 3, no. 3, pp. 387-397, July 2015; and L. Rao, X. Liu, L. Xie, and Z. Pang, "Hedging against uncertainty: A tale of Internet data center operations under smart grid environment," *IEEE Transactions on Smart Grid*, vol. 2, no. 3, pp. 555-563, September 2011, each incorporated herein by reference in their entirety. Several studies adopt the temporal variation of the price of a grid to minimize the consumption of energy in data centers. Others explore the geographical variation of price of a grid in multiple areas to decrease the consumption of energy in clouds.

In existing systems, only the average delay constraints of arriving tasks of each application are met. As a result, the long tail effect of a task delay in the real-time cloud causes the task delay constraint to fail. See D. Zats, T. Das, P. Mohan, D. Borthakur, and R. Katz, "Detail: Reducing the flow completion time tail in datacenter networks," in *Proc. ACM SIGCOMM* 2012, 2012, pp. 139-150, incorporated herein by reference in its entirety.

Task arrival tends to be aperiodic, making it difficult to execute all tasks with limited resources in a GDC. To prevent overload of a GDC, a conventional admission control method is designed to selectively refuse some tasks. See R. Krebs, P. Schneider, and N. Herbst, "Optimization method for request admission control to guarantee performance isolation," in *Proc. $2^{nd}$ International Workshop on Hot Topics in Cloud Service Scalability*, 2014, pp. 4:1-4:8, incorporated herein by reference in its entirety. However, these studies do not give an explicit relation between the refusal of tasks of each application and the service rates in a GDC.

Task scheduling in clouds has received more attention and investigation in recent years. See X. Deng, D. Wu, J. Shen, and J. He, "Eco-aware online power management and load scheduling for green cloud datacenters," *IEEE Systems Journal*, vol. 10, no. 1, pp. 78-87, March 2016; X. Zhu, L. T. Yang, H. Chen, J. Wang, S. Yin, and X. Liu, "Real-time tasks oriented energy-aware scheduling in virtualized clouds," *IEEE Transactions on Cloud Computing*, vol. 2, no. 2, pp. 168-180, April 2014; X. Lin, Y. Wang, Q. Xie, and M. Pedram, "Task scheduling with dynamic voltage and frequency scaling for energy minimization in the mobile cloud computing environment," *IEEE Transactions on Services Computing*, vol. 8, no. 2, pp. 175-186, March 2015; X. Xu, L. Cao, and X. Wang, "Adaptive task scheduling strategy based on dynamic workload adjustment for heterogeneous Hadoop clusters," *IEEE Systems Journal*, vol. 10, no. 2, pp. 471-482, June 2016; and Y. Wang and W. Shi, "Budget-driven scheduling algorithms for batches of MapReduce jobs in heterogeneous clouds," *IEEE Transactions on Cloud Computing*, vol. 2, no. 3, pp. 306-319, July 2014, each incorporated herein by reference in their entirety.

The work of Deng et al. presents an algorithm to schedule tasks when the price of a power grid is minimal amongst intervals in their delay bounds. However, some tasks must be refused, due to the restriction of available energy.

The work of Zhu et al. developed an algorithm to schedule aperiodic and independent tasks that are more complex. The algorithm is derived based upon an energy-aware architecture that supports rolling-horizon scheduling in cloud computing.

The work of Lin et al. studies the task scheduling problem in a mobile cloud where task migration frequently occurs, making the scheduling more difficult. An algorithm is proposed to perform the linear-time task migration based on a minimal-delay solution. Energy reduction based on a dynamic voltage and frequency scaling method is realized, while deadline constraints of a task are met.

The work of Xu et al. proposes an adaptive scheduling algorithm for tasks that execute in distributed Hadoop systems. The self-regulation of task trackers at runtime can be achieved by adapting to workload changes, and therefore can avoid performance bottleneck in job trackers.

The work of Wang and Shi considers the scheduling of MapReduce workflows that include multiple MapReduce jobs. An optimal scheduling algorithm is proposed to dispatch MapReduce workflows, while deadline and budget bounds are met.

However, task scheduling approaches in the aforementioned studies fail to efficiently solve the profit maximization problem of data centers.

Several works have been presented to apply renewable energy to large-scale green data centers. See J. Bi, H. Yuan, W. Tan, and B. H. Li, "TRS: Temporal request scheduling with bounded delay assurance in a green cloud data center," *Information Sciences*, vol. 360, pp. 57-72, April 2016; A. Amokrane, R. Langar, M. Zhani, R. Boutaba, and G. Pujolle, "Greenslater: On satisfying green SLAs in distributed clouds," *IEEE Transactions on Network and Service Management*, vol. 12, no. 3, pp. 363-376, September 2015; M. Qiu, Z. Ming, J. Li, K. Gai, and Z. Zong, "Phase-change memory optimization for green cloud with genetic algorithm," *IEEE Transactions on Computers*, vol. 64, no. 12, pp. 3528-3540, December 2015; K. K. Nguyen and M. Cheriet, "Environment-aware virtual slice provisioning in green cloud environment," *IEEE Transactions on Services Computing*, vol. 8, no. 3, pp. 507-519, May 2015; and X. Zuo, G. Zhang, and W. Tan, "Self-adaptive learning PSO-based deadline constrained task scheduling for hybrid IaaS cloud," *IEEE Transactions on Automation Science and Engineering*, vol. 11, no. 2, pp. 564-573, April 2014, each incorporated herein by reference in their entirety.

The work of Bi et al. presents an algorithm to allocate tasks when the amount of renewable energy is a maximum among intervals in delay bounds. However, some tasks may be refused due to the limit of available energy in a GDC.

The work of Amokrane et al. considers the variation in renewable energy and electricity prices in distributed infrastructures. This study clearly specifies limits on the carbon footprint of GDCs by designing green Service Level Agreements (SLAs) based on which carbon emissions and violation penalties of SLAs are reduced.

The work of Qiu et al. considers a green cloud system consisting of chip multiprocessors. A generic algorithm is presented to effectively decrease the maximum consumption of memory and increase the usage efficiency of memory.

The work of Nguyen and Cheriet considers an environment-aware virtual slice assignment problem in a virtual data center that is more realistic and widely developed. The optimal solution is proposed to improve energy efficiency by investigating various consolidation methods and adopting renewable energy sources. However, resources of a single data center are limited and therefore some tasks may be refused.

The work of Zuo et al. proposes an algorithm to selectively schedule tasks to public clouds when resources of an Infrastructure as a Service (IaaS) cloud are not adequate. However, it ignores the temporal variation in the price of a power grid and green energy.

An increasing number of studies have been presented to model the performance of tasks and ensure quality of service. See J. Mei, K. Li, A. Ouyang, and K. Li, "A profit maximization scheme with guaranteed quality of service in cloud computing," *IEEE Transactions on Computers*, vol. 64, no. 11, pp. 3064-3078, November 2015; X. Chang, B. Wang, J. K. Muppala, and J. Liu, "Modeling active virtual machines on IaaS clouds using an N/G/m/m+K queue," *IEEE Transactions on Services Computing*, vol. 9, no. 3, pp. 408-420, May 2016; J. Bi, H. Yuan, M. Tie, and W. Tan, "SLA-based optimisation of virtualised resource for multi-tier web applications in cloud data centres," *Enterprise Information Systems*, vol. 9, no. 7, pp. 743-767, September 2015; H. Yuan, J. Bi, W. Tan, and B. Li, "CAWSAC: Cost-aware workload scheduling and admission control for distributed cloud data centers," *IEEE Transactions on Automation Science and Engineering*, vol. 13, no. 2, pp. 976-985, 2016; and X. Qiu, Y. Dai, Y. Xiang, and L. Xing, "A hierarchical correlation model for evaluating reliability, performance, and power consumption of a cloud service," *IEEE Transactions on Systems, Man, and Cybernetics: Systems*, vol. 46, no. 3, pp. 401-412, March 2016, each incorporated herein by reference in their entirety.

The work of Mei et al. designs a resource scheme that can effectively decrease the resource cost, while guaranteeing the quality of service. An M/M/m+D queueing model is adopted to model a service system.

The work of Chang et al. develops a more complicated M/G/m queue to derive an analytical model to evaluate virtual machine performance in IaaS clouds. A series of performance metrics, such as the probability distribution of tasks are computed.

The work of Bi et al. proposes a hybrid queueing framework including an M/M/1 and multiple M/M/m queue models. A heuristic method is provided to specify the number of switched-on virtual machines for web applications and realize profit maximization for a cloud.

Contrary to Bi et al., the work of Yuan et al. applies an M/M/1 queue model to analyze geo-distributed clouds. Based on this model, a request-allocating algorithm is proposed to concurrently specify the number of switched-on servers and network providers.

The work of Qiu et al. proposes a hierarchical model that encompasses queuing theory, Markov models, and the Bayesian approach to evaluate the correlations of metrics, such as performance, power consumption, and reliability. The relation between power consumption and performance is further developed and evaluated.

For the above-mentioned works, the delay of tasks is modeled according to queueing theory. However, only the average delay of all arriving tasks is guaranteed. The long tail effect in the delay of tasks in clouds is demonstrated, where some task delay might aggressively violate its corresponding delay bound. See Y. Xu, Z. Musgrave, B. Noble, and M. Bailey, "Workload-aware provisioning in public clouds," *IEEE Internet Computing*, vol. 18, no. 4, pp. 15-21, July 2014, incorporated herein by reference in its entirety.

The "background" description provided herein is for the purpose of generally presenting the context of the disclosure. Work of the presently named inventors, to the extent it is described in this background section, as well as aspects of the description which may not otherwise qualify as conventional at the time of filing, are neither expressly nor impliedly admitted as conventional against the present disclosure.

SUMMARY

One embodiment includes a method of scheduling tasks, which includes receiving a plurality of application tasks into one or more queues of a green data center (GDC), and determining a service rate for a plurality of servers to process the plurality of application tasks in the GDC, via processing circuitry. Determining the service rate for the plurality of servers includes initializing, via the processing circuitry, a random velocity and a random position for a plurality of representative application tasks in a cluster of application tasks; determining, via the processing circuitry, an initial fitness level of each representative application task in the cluster of application tasks; determining, via the processing circuitry, an initial optimum position of each representative application task and an initial optimum position of the cluster of application tasks; initializing, via the processing circuitry, one or more task scheduling parameters for a given number of time slots; updating, via the processing circuitry, a velocity and a position of each representative application task based upon the initialized task scheduling parameters; calculating, via the processing circuitry, a current fitness level of each representative application task in a current cluster of application tasks; updating, via the processing circuitry, a current optimum position of each representative application task and a current optimum position of the cluster of application tasks; calculating, via the processing circuitry, a chaotic search parameter for an iteration in a chaotic system; and updating, via the processing circuitry, the velocity and the position of each representative application task based in part upon the chaotic search parameter. The method also includes scheduling, via the processing circuitry, one or more of the application tasks to be executed in one or more of the servers at a rate according to a difference in an accumulated arriving rate for the plurality of application tasks into the one or more queues and a removal rate for the plurality of application tasks from the one or more queues; and removing the one or more application tasks from their associated queues for execution in the scheduled one or more servers.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIGS. 14A-14B are flowcharts illustrating an exemplary method of scheduling tasks according to one embodiment.

DETAILED DESCRIPTION

The following descriptions are meant to further clarify the present disclosure by giving specific examples and embodiments of the disclosure. These embodiments are meant to be illustrative rather than exhaustive. The full scope of the disclosure is not limited to any particular embodiment disclosed in this specification, but rather is defined by the claims.

It will be appreciated that in the development of any such actual implementation, numerous implementation-specific decisions need to be made in order to achieve the developer's specific goals, such as compliance with application- and business-related constraints, and that these specific goals will vary from one implementation to another and from one developer to another.

Embodiments described herein meet delay constraints of tasks of each application by proposing a Time-Aware Task Scheduling (TATS) algorithm. It can achieve profit maximization for a GDC by smartly scheduling arriving tasks to execute within their delay bounds. Embodiments described herein differ from existing studies in that TATS can guarantee the delay bound of each admitted task in a GDC. Embodiments described herein can achieve profit maximization for a GDC provider by considering the temporal variation for revenue, price of the grid, and the green energy in delay bounds of various tasks. Tasks of each application are put into a separate queue, such as a FCFS queue. The associated delay bound constraints are guaranteed. Embodiments also provide a mathematical modeling of task refusal and service rates of tasks. In addition, temporal task scheduling is provided by hybrid chaotic Particle Swarm Optimization (PSO) based on simulated-annealing algorithm.

The profit maximization problem for a GDC is formulated and implemented with a hybrid meta-heuristic algorithm. The delay constraint of each admitted task corresponding to each application can be strictly met by scheduling all admitted tasks to execute within their delay bounds.

Simulation results with real-time data, such as tasks in Google cluster, virtual machine (VM) execution prices, price of a grid, solar irradiance, and wind speed are conducted to evaluate the proposed TATS. See M. Dabbagh, B. Hamdaoui, M. Guizani, and A. Rayes, "Energy-efficient resource allocation and provisioning framework for cloud data centers," *IEEE Transactions on Network and Service Management*, vol. 12, no. 3, pp. 377-391, September 2015; NYISO. Extensive simulations demonstrate that it performs better than several typical scheduling algorithms with respect to profit and throughput.

Figure 1:
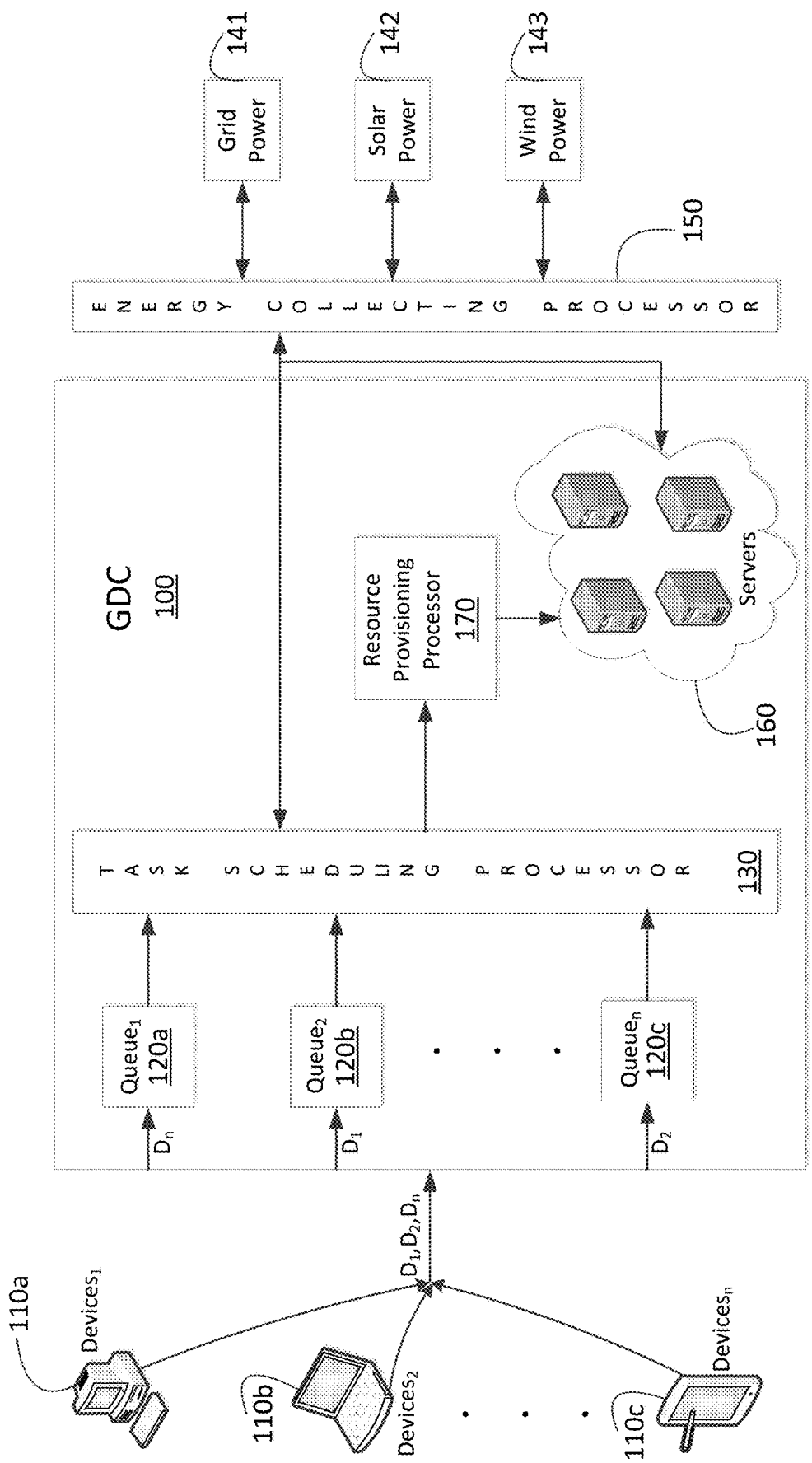
FIG. 1 is a block diagram of an exemplary green data center (GDC) according to one embodiment.

An exemplary GDC 100 used herein is illustrated in FIG. 1. A cloud provider manages the GDC 100 and provides multiple types of application services to users around the world. Tasks from users can be sent through multiple types of electronic devices 110, such as smart phones, computers, servers, and laptops.

Tasks arriving from the electronic devices 110 can be processed on a First-Come-First-Served (FCFS) policy, for example. Tasks of each application are enqueued into a queue processor 120a-c, such as a FCFS queue processor. The information of all queue processors 120 is sent to a task scheduling processor 130.

The GDC 100 can acquire electricity from multiple types of power suppliers. Three energy suppliers are illustrated, which include a grid power source 141, a solar power renewable source 142, and a wind power renewable source 143. However, other power sources and other renewable power sources are contemplated by embodiments described herein.

The information about the grid power source 141, the solar power renewable source 142, and the wind power renewable source 143 primarily includes the price of the power grid, the solar irradiance, the wind speed, on-site air density, the average idle (peak) power of each server, etc. The information is collected, via an energy collecting processor 150, which is periodically reported to the task scheduling processor 130.

The task is formulated into a constrained optimization problem, as described in more detail herein. The task is solved by a Hybrid Chaotic PSO, based on Simulated-annealing (HCPS) in each iteration of TATS. Based on the optimal solutions obtained by HCPS, time-aware scheduling of multi-application tasks is realized to achieve profit maximization for the GDC 100, while delay bounds of all tasks are strictly guaranteed.

The task scheduling processor 130 is considered where TATS is executed. Based on the scheduling strategy specified by TATS, the task scheduling processor 130 can determine the service rates of servers 160 corresponding to each application in each interval, while respecting the corresponding delay bounds of each application.

The setting information of servers 160 is sent to a resource provisioning processor 170, which configures the servers 160 in the GDC 100. It can be assumed that the servers 160 of each application are homogeneous, while servers 160 corresponding to different applications are heterogeneous in hardware. TATS runs to maximize the profit of GDC providers, while the user-specified delay constraint of each admitted task of each application is guaranteed.

Arriving tasks of each application are enqueued into their corresponding queue processor 120. Let $B_n$ denote the delay bound of tasks of application n. For each application n, TATS can ensure that by each interval $\tau$, all tasks arriving in interval $\tau$-$B_n$ or before must be scheduled to the GDC 100. TATS is inclined to schedule remaining tasks that arrive earlier in each queue processor 120. Therefore, remaining tasks arriving in interval $\tau$-$B_n$ are first executed in the GDC 100 by interval $\tau$. In this way, delay constraints of all arriving tasks are strictly guaranteed.

TATS also considers the temporal variation in the revenue, price of the power grid, and renewable energy sources in the delay bounds of tasks. As a result, TATS integrates the temporal variation into a constrained optimization problem, which is solved by HCPS. Therefore, TATS can intelligently schedule arriving tasks to execute in the GDC 100 and achieve profit maximization for GDC providers.

FIG. 1 illustrates GDC 100. Similar to Bi et al., the GDC 100 is modeled as a system having discrete intervals. See J. Bi, H. Yuan, W. Tan, M. C. Zhou, Y. Fan, J. Zhang, and J. Li, "Application-aware dynamic fine-grained resource provisioning in a virtualized cloud data center," to appear in *IEEE Transactions on Automation Science and Engineering*, doi: 10.1109/TASE.2015.2503325, 2016, incorporated herein by reference in its entirety.

High-configuration servers are growingly deployed in current GDCs. Similar to Yuan et al., it is reasonable to assume that a single task of each application can be executed completely in an interval. In FIG. 1, tasks of each application are put into their corresponding queue processor 120.

The following notations are used herein to develop a delay constraint. For application n, let $\lambda_\tau^n$ denote the arriving rate of its tasks in time interval $\tau$. In addition, task service rates in intervals $\tau$ and $\tau$+b ($1 \leq b \leq B_n$) are denoted by $\mu_\tau^n$ and $\mu_{\tau+b}^n$, respectively. For example, let $\mu_\tau^n$ denote the rate at which tasks of application n are removed from their corresponding queue processor 120, and executed in the GDC 100 in interval $\tau$. For application n, the number of its tasks accumulated during t intervals is denoted by $\Lambda_\tau^n$. Similarly, the number of tasks scheduled in $\tau$ intervals is denoted by $D_\tau^n$. Let L denote the length of each interval. The number of tasks accumulated during $\tau$ intervals can be expressed as follows.

$$\Lambda_\tau^n = \sum_{i=1}^{\tau} \lambda_i^n L \qquad (1)$$

$$D_\tau^n = \sum_{i=1}^{\tau} \lambda_i^{na}(1 - \delta(\lambda_i^{na}, \mu_i^n))L \qquad (2)$$

In Equation (2), the accumulated arriving rate of tasks of application n in interval $\tau$ is denoted by $\lambda_\tau^{na}$. The remaining arriving rate of tasks of application n in interval $\tau$ is denoted by $\lambda_\tau^{na}$. In addition, the proposed TATS can satisfy the delay constraint $B_n$ of tasks of application n. Therefore, all tasks of application n that arrive in interval $\tau$−B or before need to be scheduled and executed in the GDC 100, which leads to $\lambda_i^{nr}=0 (i \leq \tau - B_n - 1)$. As a result, $\lambda_\tau^{na}$ can be obtained as follows in Equation (3).

$$\lambda_\tau^{na} = \lambda_\tau^n + \sum_{i=\tau-B_n}^{\tau-1} \lambda_i^{nr} \quad (3)$$

In Equation (2), the loss possibility of tasks of application n in interval τ in the GDC 100 is denoted by $\delta(\lambda_\tau^{na}, \mu_\tau^n)$. Similar to Zhu et al., servers 160 corresponding to each application n in the GDC 100 are modeled as an M/M/1/$C_n$/∞ queueing system. See Z. Zhu, J. Bi, H. Yuan, and Y. Chen, "SLA based dynamic virtualized resources provisioning for shared cloud data centers," in *Proc. 2011 IEEE International Conference on Cloud Computing*, 2011, pp. 630-637, incorporated herein by reference in its entirety. The task capacity of servers 160 of application n in the GDC 100 is $C_n$ in total. The loss possibility of tasks of application n in interval t in the GDC 100 can be expressed as follows.

$$\delta(\lambda_\tau^{na}, \mu_\tau^n) = \begin{cases} \dfrac{1 - \dfrac{\lambda_\tau^{na}}{\mu_\tau^n}}{1 - \left(\dfrac{\lambda_\tau^{na}}{\mu_\tau^n}\right)^{C_n+1}} \left(\dfrac{\lambda_\tau^{na}}{\mu_\tau^n}\right)^{C_n} & \mu_\tau^n > 0, \\ 1 & \mu_\tau^n = 0. \end{cases} \quad (4)$$

Tasks of application n need to be scheduled and executed in the GDC 100 in their delay bound $B_n$. Therefore, for application n, all its tasks arriving in interval τ need to be scheduled and executed from τ to τ+$B_n$. For application n, all its tasks in interval τ-$B_n$ or before need to be scheduled and executed by interval τ, which can be expressed as follows.

$$\Lambda_{\tau-B_n-1}^n + \lambda_{\tau-B_n}^n L \le D_{\tau-1}^n + (\lambda_\tau^{na}(1 - \delta(\lambda_\tau^{na}, \mu_\tau^n))L) \quad (5)$$

In each interval τ, let $\tilde{\lambda}_u^{na}$ denote the accumulated arriving rate of tasks of application n predicted in interval u (τ+1≤u≤τ+$B_n$). Similarly, in each interval τ, let $\tilde{\mu}_u^n$ denote the task service rate of application n predicted in interval u (τ+1≤u≤τ+$B_n$). Note that $\tilde{\lambda}_u^{na}$ can be predicted by existing prediction algorithms, such as neural networks and robust regression. At the start of interval τ, $\tilde{\lambda}_u^{na}$ is set to $\lambda_u^n$, i.e., $\tilde{\lambda}_u^{na} = \lambda_u^n$ (τ+1≤u≤τ+$B_n$). The decision variables of $\mu_u^n$ are determined by TATS. All application tasks of n in τ+b-$B_n$ or before are scheduled and executed by interval τ+b, which can be expressed as follows.

$$\Lambda_{\tau-B_n-1}^n + \sum_{u=\tau-B_n}^{\tau-B_n+b} (\lambda_u^n L) \le \quad (6)$$

$$D_{\tau-1}^n + (\lambda_\tau^{na}(1 - \delta(\lambda_\tau^{na}, \mu_\tau^n))L) + \sum_{u=\tau+1}^{\tau+b} (\tilde{\lambda}_u^{na}(1 - \delta(\tilde{\lambda}_u^{na}, \tilde{\mu}_u^n))L), \quad 1 \le b \le B_n$$

In addition, at the start of interval τ for application n, the number of its already-arrived tasks, $\Lambda_\tau^n$, is obtained. Therefore, the number of tasks that have already arrived can be expressed as follows.

$$\Lambda_\tau^n = \Lambda_{\tau-B_n-1}^n + \sum_{u=\tau-B_n}^{\tau} (\lambda_u^n L) \quad (7)$$

For application n, the delay constraint of its arriving tasks in interval τ is satisfied if they are executed from interval τ to τ+$B_n$. Therefore, at the start of interval τ, the number of tasks of application n that are scheduled in interval τ is $\lambda_\tau^{na}(1-\delta(\lambda_\tau^{na},\mu_\tau^n))L$. At the start of interval τ, the expected number of tasks of application n scheduled in interval τ+b(1≤b≤$B_n$) is $(\tilde{\lambda}_u^{na}(1-\delta(\tilde{\lambda}_u^{na},\tilde{\mu}_u^n))$ L). Therefore, for application n in interval τ, the predicted number of its tasks executed by τ+$B_n$ can be expressed as follows.

$$D_{\tau+B_n}^n = D_{\tau-1}^n + (\lambda_\tau^{na}(1 - \delta(\lambda_\tau^{na}, \mu_\tau^n))L) + \sum_{u=\tau+1}^{\tau+B_n} (\tilde{\lambda}_u^{na}(1 - \delta(\tilde{\lambda}_u^{na}, \tilde{\mu}_u^n))L) \quad (8)$$

As a result, owing to the conservation of tasks of each application n, $\Lambda_\tau^n$ should equal $D_{\tau+B_n}^n$, i.e., $\Lambda_\tau^n = D_{\tau+B_n}^n$ which is expressed as follows.

$$\Lambda_{\tau-B_n-1}^n + \sum_{u=\tau-B_n}^{\tau} (\lambda_u^n L) = \quad (9)$$

$$D_{\tau-1}^n + (\lambda_\tau^{na}(1 - \delta(\lambda_\tau^{na}, \mu_\tau^n))L) + \sum_{u=\tau+1}^{\tau+B_n} (\tilde{\lambda}_u^{na}(1 - \delta(\tilde{\lambda}_u^{na}, \tilde{\mu}_u^n))L)$$

Hence, meeting constraints (5), (6), and (9) can guarantee the delay constraint of tasks of application n will be met.

A power consumption model used in the GDC 100 is described herein. In this model, it is assumed that servers 160 corresponding to each application n in the GDC 100 are homogeneous in terms of configuration. Therefore, the energy consumption profiles of servers 160 corresponding to the same application are the same. Each switched-on server 160 of application n can execute $\sigma_n$ tasks of application n per minute. $m_\tau^n$ denotes the number of switched-on servers 160 of application n in the GDC 100 in interval τ. Therefore, the service rates of servers 160 in interval an be calculated as follows.

$$\mu_\tau^n = \sigma_n m_\tau^n \quad (10)$$

For application n, its corresponding available number of physical servers 160 is denoted by $\Omega_n$. Let τ= $\max_{n \in \{1,2,\ldots,N\}}(B_n)$. Therefore, for application n, the total number of switched-on servers 160 in interval τ+b, denoted by $m_{\tau+b}^n$, needs to be no more than $\Omega_n$, which is expressed as follows.

$$m_{\tau+b}^n \le \Omega_n, \quad 0 \le b \le \daleth \quad (11)$$

The total power of the GDC 100 can be obtained by adding the power consumed by the facilities (e.g., lighting and cooling) to the power of servers 160 of all applications. For the GDC 100, the power usage effectiveness (PUE) can be obtained by calculating the ratio of power usage of the GDC 100 to the total power of its servers 160. See A. N. Toosi, K. Vanmechelen, F. Khodadadi, and R. Buyya, "An auction mechanism for cloud spot markets," *ACM Trans. Auton. Adapt. Syst*, vol. 11, no. 1, pp. 2:1-2:33, April 2016, incorporated herein by reference in its entirety. PUE is an important metric to qualify a GDC's energy efficiency. Let γ denote the PUE of the GDC 100. γ of many current data centers is typically 1.2-2.0. See A. Beloglazov, J. Abawajy, and R. Buyya, "Energy-aware resource allocation heuristics for efficient management of data centers for cloud computing," *Future Generation Computer Systems*, vol. 28, no. 5, pp. 755-768, May 2012, incorporated herein by reference in its entirety.

The average idle power of each server 160 of application n is denoted by $\overline{P}_0^n$. The average peak power of each server 160 of application n when it is executing corresponding tasks is denoted by $\overline{P}_1^n$. In addition, let $u_\tau^n$ denote the CPU utilization of servers 160 of application n in the GDC 100 in interval $\tau$. Therefore, the total power usage of the GDC 100 in interval $\tau$ is obtained in Equation (12) as follows:

$$P_\tau = \sum_{n=1}^{N} \left( m_\tau^n (\overline{P}_0^n + (\gamma - 1)\overline{P}_1^n + (\overline{P}_1^n - \overline{P}_0^n) u_\tau^n) \right) \quad (12)$$

See A. Qureshi, R. Weber, H. Balakrishnan, J. Guttag, and B. Maggs, "Cutting the electric bill for internet-scale systems," *SIGCOMM Comput. Commun. Rev*, vol. 39, no. 4, pp. 123-134, August 2009, incorporated herein by reference in its entirety.

For the loss possibility $\delta(\lambda_\tau^{na}, \mu_\tau^n)$, the number of tasks of application n that each corresponding switched-on server 160 can execute in interval $\tau$ is expressed as follows.

$$\frac{L(1 - \delta(\lambda_\tau^{na}, \mu_\tau^n))\lambda_\tau^{na}}{m_\tau^n} \quad (13)$$

The busy time of each switched-on server 160 of application n is $$\frac{L(1 - \delta(\lambda_\tau^{na}, \mu_\tau^n))\lambda_\tau^{na}}{\sigma_n m_\tau^n}$$

minutes. Therefore, $\mu_\tau^{na}$ is calculated as follows.

$$u_\tau^n = \frac{(1 - \delta(\lambda_\tau^{na}, \mu_\tau^n))\lambda_\tau^{na}}{\sigma_n m_\tau^n} \quad (14)$$

Based on (10), (12), and (14), the total energy of the GDC 100 in interval $\tau$, $E_\tau$, is obtained as follows.

$$E_\tau = \sum_{n=1}^{N} \left( \frac{g_n \mu_\tau^n + h_n \lambda_\tau^{na}(1 - \delta(\lambda_\tau^{na}, \mu_\tau^n))}{\sigma_n} L \right) \quad (15)$$

where $$g_n \triangleq \overline{P}_0^n + (\gamma - 1)\overline{P}_1^n \quad (16)$$

$$h_n \triangleq \overline{P}_1^n - \overline{P}_0^n \quad (17)$$

The maximum amount of available energy in the GDC 100 in each interval $\tau$s denoted by $\omega$. Therefore, the total energy consumption of the GDC 100 in intervals $\tau$ or $\tau+b$ ($1 \leq b \leq \tau$) is no greater than $\omega$, which is expressed as follows.

$$\sum_{n=1}^{N} \left( \frac{g_n \mu_\tau^n + h_n \lambda_\tau^{na}(1 - \delta(\lambda_\tau^{na}, \mu_\tau^n))}{\sigma_n} L \right) \leq \omega \quad (18)$$

$$\sum_{n=1}^{N} \left( \frac{g_n \tilde{\mu}_{\tau+b}^n + h_n \tilde{\lambda}_{\tau+b}^{na}(1 - \delta(\tilde{\lambda}_{\tau+b}^{na}, \tilde{\mu}_{\tau+b}^n))}{\sigma_n} L \right) \leq \omega, 1 \leq b \leq \daleth \quad (19)$$

In a conventional system, green energy generators (e.g., solar panels) are installed in a GDC. The power grid energy of a conventional GDC can be minimized when green energy is used.

Two types of green energy sources are considered herein in developing a green power model. Since the length of an interval is small enough, it can be assumed that green energy remains unchanged within a single slot.

The amount of energy produced by the solar source in interval $\tau$ is denoted by $E_\tau^s$. The conversion rate of solar radiation to electricity is denoted by $\psi$. Let $I_\tau$ denote the solar irradiance in interval $\tau$. For solar panels, their active irradiation area is denoted by $\kappa$. Using the solar energy model, $E_\tau^s$ can be obtained as follows.

$$E_\tau^s = \kappa \psi(I_\tau)L \quad (20)$$

See M. F. Hsieh, F. S. Hsu, and D. G. Dorrell, "Winding changeover permanent-magnet generators for renewable energy applications," *IEEE Transactions on Magnetics*, vol. 48, no. 11, pp. 4168-4171, November 2012, incorporated herein by reference in its entirety.

Similarly, $E_\tau^\omega$ denotes the amount of energy generated by wind in interval $\tau$. The rate at which wind is converted to electricity is denoted by $\eta$. The on-site air density is denoted by $\rho$. Let $\zeta$ denote the rotor area of wind turbines. Let $v_r$ denote the wind speed. Using the wind energy model of Hsieh et al., $E_\tau^\omega$ can be obtained as follows.

$$E_\tau^w = \frac{1}{2}\eta\rho\zeta(v_\tau)^3 L \quad (21)$$

Developing a constrained optimization problem is discussed herein. Let $\tilde{\delta}_\tau^n$ and $\tilde{\delta}_{\tau+b}^n$ denote the revenue of tasks of application n in intervals $\tau$ and $\tau+b$, respectively. In order to guarantee the performance for users' tasks, the service level agreement (SLA) is conventionally specified between users and a GDC. Let $\theta_\tau^n$ denote the payment brought by the execution of each task of application n in interval $\tau$. The penalty paid by the GDC due to the refusal of each task of application n in interval $\tau$ is denoted by $v_\tau^n$. Therefore, $\tilde{\delta}_\tau^n$ and $\tilde{\delta}_{\tau+b}^n$ can be obtained as follows.

$$\partial_\tau^n = (1 - \delta(\lambda_\tau^{na}, \mu_\tau^n))\lambda_\tau^{na}\theta_\tau^n - \delta(\lambda_\tau^{na}, \mu_\tau^n)\lambda_\tau^{na}\vartheta_\tau^n \quad (22)$$

$$\partial_{\tau+b}^n = (1 - \delta(\tilde{\lambda}_{\tau+b}^{na}, \tilde{\mu}_{\tau+b}^n))\tilde{\lambda}_{\tau+b}^{na}\theta_\tau^n - \delta(\tilde{\lambda}_{\tau+b}^{na}, \tilde{\mu}_{\tau+b}^n)\tilde{\lambda}_{\tau+b}^{na}\vartheta_\tau^n \quad (23)$$

Let $f_1$ denote the total revenue of the GDC brought by tasks of all applications from interval $\tau$ to $\tau+b$. As a result, $f_1$ can be obtained as follows.

$$f_1 = \sum_{n=1}^{N} \left( \partial_\tau^n + \sum_{b=1}^{B_n} \partial_{\tau+b}^n \right) \quad (24)$$

The grid energy price in intervals $\tau$ and $\tau+b$ are denoted by $\rho_\tau$ and $\tilde{\rho}_{\tau+b}$, respectively. It is assumed that the grid energy price remains unchanged in each interval and can vary from interval to interval. In addition, the amount of grid energy for the GDC in interval $\tau$ is calculated as $\max(E_\tau - E_\tau^s - E_\tau^\omega, 0)$. The amount of grid energy of the GDC consumed in interval $\tau+b$ is obtained as $\max(\tilde{E}_{\tau+b} - \tilde{E}_{\tau+b}^s - \tilde{E}_{\tau+b}^\omega, 0)$. Let $f_2$ denote the grid energy cost of the GDC from intervals $\tau$ to $\tau+1$ which is expressed as follows.

$$f_2 = \rho_\tau \left(\max(E_\tau - E_\tau^s - E_\tau^w, 0)\right) + \sum_{b=1}^{\daleth} \left(\tilde{\rho}_{\tau+b} \left(\max(\tilde{E}_{\tau+b} - \tilde{E}_{\tau+b}^s - \tilde{E}_{\tau+b}^w, 0)\right)\right) \quad (25)$$

Based on (1)-(25), the Profit Maximization Problem ($P_1$) for the GDC 100 according to embodiments described herein can be given as follows.

$$\underset{\mu_\tau^n, \tilde{\mu}_{\tau+b}^n}{\text{Max}} \{f_1 - f_2\}$$

subject to $$|m_{\tau+b}^n| \leq \Omega_n, 0 \leq b \leq \daleth \quad (26)$$

$$\sum_{n=1}^{N}\left(\frac{g_n\mu_\tau^n + h_n\lambda_\tau^{na}(1-\delta(\lambda_\tau^{na},\mu_\tau^n))}{\sigma_n}L\right) \leq \varpi \quad (27)$$

$$\sum_{n=1}^{N}\left(\frac{g_n\tilde{\mu}_{\tau+b}^n + h_n\tilde{\lambda}_{\tau+b}^{na}(1-\delta(\tilde{\lambda}_{\tau+b}^{na},\tilde{\mu}_{\tau+b}^n))}{\sigma_n}L\right) \leq \varpi, 1 \leq b \leq \daleth \quad (28)$$

$$\Lambda_{\tau-B_n-1}^n + \lambda_{\tau-B_n}^n L \leq D_{\tau-1}^n + (\lambda_\tau^{na}(1-\delta(\lambda_\tau^{na},\mu_\tau^n))L) \quad (29)$$

$$\Lambda_{\tau-B_n-1}^n + \sum_{u=\tau-B_n}^{\tau-B_n+b}(\lambda_u^n L) \leq \quad (30)$$

$$D_{\tau-1}^n + (\lambda_\tau^{na}(1-\delta(\lambda_\tau^{na},\mu_\tau^n))L) + \sum_{u=\tau+1}^{\tau+b}(\tilde{\lambda}_u^{na}(1-\delta(\tilde{\lambda}_u^{na},\tilde{\mu}_u^n))L), 1 \leq b \leq B_n$$

$$\Lambda_{\tau-B_n-1}^n + \sum_{u=\tau-B_n}^{\tau}(\lambda_u^n L) = \quad (31)$$

$$D_{\tau-1}^n + (\lambda_\tau^{na}(1-\delta(\lambda_\tau^{na},\mu_\tau^n))L) + \sum_{u=\tau+1}^{\tau+B_n}(\tilde{\lambda}_u^{na}(1-\delta(\tilde{\lambda}_u^{na},\tilde{\mu}_u^n))L)$$

$$\mu_\tau^n > 0, \tilde{\mu}_{\tau+b}^n > 0, 1 \leq b \leq B_n \quad (32)$$

$$\tilde{\mu}_{\tau+b}^n = 0, B_n < b \leq \daleth \quad (33)$$

In the constrained optimization problem, the valid ranges of decision variables including $\mu_\tau^n$ and $\tilde{\mu}_{\tau+b}^n$ ($1 \leq b \leq 1$) are shown in Equations (32) and (33). It is assumed that time-related parameters including $\lambda_\tau^{na}$, $\tilde{\lambda}_{\tau+b}^{na}$, $p_\tau\tilde{p}_{\tau+b}$, $I\tau$, $\tilde{1}_{\tau+b}$, $v_\tau$, and $\tilde{v}_{\tau+b}$ can be obtained with existing prediction algorithms at the beginning of interval $\tau$. See M. Dabbagh, B. Hamdaoui, M. Guizani, and A. Rayes, "Toward energy-efficient cloud computing: Prediction, consolidation, and overcommitment," *IEEE Network*, vol. 29, no. 2, pp. 56-61, March 2015, incorporated herein by reference in its entirety.

The solution algorithms for $P_1$ are described herein. The decision variables ($\mu_\tau^n$ and $\tilde{\mu}_{\tau+b}^n$) corresponding to the final solution to $P_1$ can determine the service rates of servers 160 corresponding to each application while satisfying their delay bounds in the GDC 100. In this way, the profit of the GDC 100 can be maximized while delay constraints of tasks of all applications are also met.

$P_1$ is a constrained optimization problem. The mechanism of a penalty function in transforming $P_1$ into unconstrained $P_2$ is discussed herein to develop atime-aware task scheduling (TATS) algorithm.

The decision variable vector includes $\mu_\tau^n$ and $\tilde{\mu}_{\tau+b}^n$, which is denoted by $\vec{h}$. $P_2$ can be calculated as follows.

$$\underset{\vec{h}}{\text{Min}} \{\hat{f} = \varsigma\varepsilon - (f_1 - f_2)\} \quad (34)$$

The augmented objective function in Equation (34) is denoted by $\hat{f}$. Let $\varsigma$ denote a relatively large positive constant. Let $\varepsilon$ denote the penalty caused by the violation of all constraints. Therefore, $\varepsilon$ is calculated as follows.

$$\varepsilon = \sum_{v=1}^{V}\left(\max\{0, -g_v(\vec{h})\}\right)^\alpha + \sum_{c=1}^{C}|h_c(\vec{h})|^\beta \quad (35)$$

In Equation (35), inequality constraint $v(1 \leq v \leq V)$ is first converted into $g_v(\vec{h}) \geq 0$. Its penalty is $$(\max\{0, -g_v(\vec{h})\})^\alpha$$

if it is not met. Similarly, equality constraint $c(1 \leq c \leq C)$ is first converted into $h_c(\vec{h}) = 0$. Therefore, its penalty is $$|h_c(\vec{h})|^\beta$$

if it is violated. Here, $\alpha$ and $\beta$ are positive integers. For example, constraint (26) is first converted into $\Omega_n - m_{\tau+b}^n \geq 0$, and its penalty is $(\max\{0, -(\Omega_n - m_{\tau+b}^n)\})^\alpha$ if it is violated. In this way, $P_2$ is obtained and implemented with a hybrid meta-heuristic as described herein.

Note that $\hat{f}$ in $P_2$ is a nonlinear function of continuous decision variables $\mu_\tau^n$ and $\tilde{\mu}_{\tau+b}^n$. Therefore, $P_2$ belongs to constrained nonlinear optimization problems. See Y.-C. Hsieh, Y.-C. Lee, and P.-S. You, "Solving nonlinear constrained optimization problems: An immune evolutionary based two-phase approach," *Applied Mathematical Modelling*, vol. 39, no. 19, pp. 5759-5768, October 2015, incorporated herein by reference in its entirety.

Some existing deterministic algorithms, such as conjugate gradient method and sequential quadratic programming can implement $P_2$. However, these algorithms need first-order or second-order derivatives of $\hat{f}$, and therefore they largely rely on specific mathematical structures of optimization problems. See F. Lenti, F. Nunziata, C. Estatico, and M. Migliaccio, "Conjugate gradient method in Hilbert and Banach spaces to enhance the spatial resolution of radiometer data," *IEEE Transactions on Geoscience and Remote Sensing*, vol. 54, no. 1, pp. 397-406, January 2016; and M. Subathra, S. Selvan, T. Victoire, A. Christinal, and U. Amato, "A hybrid with cross-entropy method and sequential quadratic programming to solve economic load dispatch problem," *IEEE Systems Journal*, vol. 9, no. 3, pp. 1031-1044, September 2015, each incorporated herein by reference in their entirety.

In addition, the search process is difficult and the quality of finally searched solutions has some drawbacks.

Existing meta-heuristic algorithms can avoid shortcomings of the deterministic algorithms discussed herein and have been widely applied to solve different types of complex optimization problems due to robustness, wide applicability, and easy implementation. However, each existing meta-heuristic algorithm has its corresponding advantages and disadvantages. For instance, simulated annealing (SA) can suitably tackle continuous and discrete constrained optimization problems. One advantage is it can intelligently escape from local optima by moving in the direction that can worsen the objective function value. It is proven that SA converges to global optima by specifying a temperature cooling rate. However, the convergence speed of SA can be very slow. See F. Rodriguez, C. Garcia-Martinez, and M. Lozano, "Hybrid metaheuristics based on evolutionary algorithms and simulated annealing: Taxonomy, comparison, and synergy test," *IEEE Transactions on Evolutionary Computation*, vol. 16, no. 6, pp. 787-800, December 2012, incorporated herein by reference in its entirety.

Particle swarm optimization (PSO) can be used as a conventional meta-heuristic algorithm, due to its quick convergence. However, it often suffers from being trapped in local optima in its search process. Therefore, its final solutions may be unacceptable when it is applied to solve difficult problems with multidimensional search spaces. See L. Liu, S. Yang, and D. Wang, "Particle swarm optimization with composite particles in dynamic environments," *IEEE Transactions on Systems, Man, and Cybernetics*, Part B, vol. 40, no. 6, pp. 1634-1648, December 2010, incorporated herein by reference in its entirety.

Moreover, chaotic search in chaotic PSO (CPSO) can approach global optima more easily and quickly than stochastic search in traditional PSO. The chaotic search can also increase the possibility of escaping from local optima due to dynamic and ergodic properties in the chaotic sequence. In CPSO, a chaotic search based on the logistic equation is adopted to perform local exploitation around solutions currently obtained by PSO. See G. Jakimoski and L. Kocarev, "Chaos and cryptography: Block encryption ciphers based on chaotic maps," *IEEE Transactions on Circuits and Systems I: Fundamental Theory and Applications*, vol. 48, no. 2, pp. 163-169, February 2001, incorporated herein by reference in its entirety. The equation (36) shown in Dabbagh et al. is expressed as follows.

$$\chi^i = \epsilon \chi^{i-1}(1 - \chi^{i-1}) \qquad (36)$$

$\chi^i$ in Equation (36) is distributed between [0, 1], and represents the chaotic parameter at iteration i in a chaotic system. $\epsilon$ represents a control parameter specified in [0, 4]. $\epsilon = 4$ and $\chi^0 \in [0, 1] - \{0, 0.25, 0.5, 0.75, 1\}$ are set, such that the stochastic pattern is added to the value of $\chi^i$.

A hybrid meta-heuristic, called Hybrid Chaotic PSO is based on Simulated-annealing (HCPS) and is applied to solve $P_2$ by combining SA and CPSO. In HCPS, the velocity of particle j in iteration i+1, $V_j^{i+1}$, is updated as follows, $$V_j^{i+1} = \omega^i \chi^i V_j^i + c_1 r_1 [\Gamma_j^i - q_j^i] + c_2 r_2 [\Theta^i - q_j^i] \qquad (37)$$

where $r_1$ and $r_2$ are two random numbers in (0, 1). $q_j^i$ denotes the position of particle j in iteration i. $\omega^i$ represents the inertia weight in iteration i. For particle j, its best position in iteration i is denoted by $\Gamma_j^i$. For the swarm, its best position in iteration i is denoted by $\Theta^i$. $c_1$ and $c_2$ denote the individual and social acceleration coefficients, respectively.

In HCPS, a particle changes its velocity based on positions of particles in a present population. The particle of each position is updated according to the Metropolis criterion of the SA. See K. Meer, "Simulated annealing versus metropolis for a TSP instance," *Information Processing Letters*, vol. 104, no. 6, pp. 216-219, December 2007, incorporated herein by reference in its entirety.

In each iteration of the HCPS, the new position of each particle is compared with its old position according to $\hat{f}$. The position of each particle with larger $\hat{f}$ is accepted, while its position with smaller $\hat{f}$ is conditionally accepted based on a certain possibility specified in the Metropolis criterion. Therefore, HCPS can increase the possibility of finding global optima to maximize the profit of the GDC 100 by escaping from local optima.

| Algorithm 1 TATS |
|---|
| 1:     Initialize $\lambda_\tau^n(-B_n \leq \tau \leq \daleth - 1)$ with 0 |
| 2:     Initialize $\lambda_\tau^{nr}$ and $\lambda_\tau^{na}(1 \leq \tau \leq N_1)$ with $\lambda_\tau^n$ |
| 3:     Initialize $\lambda_{\daleth-B_n-1}{}^n$ and $D_{\daleth-1}{}^n$ with 0 |
| 4:     $\tau \leftarrow \daleth$ |
| 5:     while $\tau \leq N_I$ do |
| 6:        Update $\lambda_\tau^{na}$ based on (3) |
| 7:        Solve $P_2$ to obtain $\mu_\tau^n$ and $\tilde{\mu}_{\tau+b}{}^n$ via HCPS, respectively |
| 8:        Schedule tasks to the GDC, and remove them from corresponding FCFS queue |
| 9:        Update $\lambda_i^{nr}(\tau - B_n \leq i \leq \tau)$ |
| 10:       $D_\tau^n \leftarrow D_{\tau-1}{}^n + (\lambda_\tau^{na}, (1 - \delta(\lambda_\tau^{na}, \mu_\tau^n))L$ |
| 11:       $\Lambda_{\tau-B_n} \leftarrow \Lambda_{\tau-B_n}{}^n + \lambda_{\tau-Bn}{}^n L$ |
| 12:       $\tau \leftarrow \tau + 1$ |
| 13:     end while |

Algorithm 1 shows the pseudo code of TATS. Line 1 initializes $\lambda_\tau^n(\daleth - B_n \leq \tau \leq \daleth - 1)$ with 0. Line 2 initializes $\lambda_\tau^{nr}$ and $\lambda_\tau^{na}(\daleth \leq \tau \leq N_1)$ with $\lambda_\tau^n$. Line 3 sets $\wedge_{\daleth-Bn-1}{}^n$ and $D_{\daleth-1}{}^n$ to 0. $N_1$ denotes the number of intervals $\lambda_\tau^{na}$, which is updated based on Equation (6). Line 7 solves $P_2$ to obtain $\mu_\tau^n$ and $\tilde{\mu}_{\tau+b}{}^n$ by HCPS. Line 8 schedules $(L(1-\delta(\lambda_\tau^{na}, \mu_\tau^n))\lambda_\tau^{na})$ tasks to execute. The tasks are removed from the head of their corresponding FCFS queue processors 120*a-c*. $\lambda_i^{nr}(\tau-B_n \leq i < \tau)$ is updated in Line 9. Lines 10-11 update $D_\tau^n$ and $\Lambda_{\tau-B_n}{}^n$.

| Algorithm 2 HCPS |
|---|
| 1:     Initialize particles' velocities and positions randomly |
| 2:     Compute the fitness values of particles |
| 3:     Update $\Gamma$ and $\Theta$ |
| 4:     Initialize $c_1, c_2, v_M, w_m, w_M, \chi^0$, and d |
| 5:     Initialize $\ell$ and w with $t^0$ and $w_M$, respectively |
| 6:     $i \leftarrow 0$ |
| 7:     while $i \leq \varphi$ and $\varrho \leq 95\%$ do |
| 8:        Update positions and velocities of particles using Metropolis acceptance criterion |
| 9:        Calulate fitness values of particles in the current swarm |
| 10:       Update $\Gamma$ and $\Theta$ |
| 11:       Decrease the temperature by d |
| 12:       Decrease w linearly from $w_M$ down to $w_m$ in iteration i |
| 13:       Calculate the chaotic parameter $\chi^{i+1}$ using (36) |
| 14:       Update $V_j^{i+1}$ and $q_j^{i+1}$ |
| 15:       Calculate and update $\varrho$ |

-continued

Algorithm 2 HCPS

16:     i ← i + 1
17:     end while
18:     Output Θ

The pseudo of HCPS is shown in Algorithm 2. The upper and lower bounds of inertia weight ω are denoted by $\omega_M$ and $\omega_m$, respectively. Velocities of particles are limited to [$-v_M$, $v_M$]. The total number of iterations is denoted by φ. The temperature in HCPS is denoted by $\ell$, which is initialized with $t^0$. The temperature cooling rate is denoted by d. In Algorithm 2, the velocities and positions of the particles are initialized randomly in Line 1. Lines 2-3 calculate fitness values of particles, and update Γ and Θ. Lines 4-5 initialize parameters including $c_1$, $c_2$, $v_M$, $\omega_m$, $\omega_M$, $\chi^0$, d, $\ell$, and ω.

Let ϱ denote the maximum percentage of particles whose fitness values are the same in the current swarm. In lines 6-7, the while loop ends when ψ is exceeded or ϱ ≤95%. The positions and velocities of particles are updated using the Metropolis acceptance criterion in Line 8. Lines 9-10 calculate fitness values of particles, and update Γ and Θ. Lines 11-12 decrease the temperature and w. Lines 13-14 calculate the chaotic parameter $X^{i+1}$ using Equation (36), and update $V_j^{i+1}$ and $q_j^{i+1}$. In lines 15-18, Θ is obtained and transformed into $\mu_\tau^n$ and $\mu_{\tau+b}^n \theta(1 \leq b \leq 7)$.

In an embodiment using TATS Algorithm 1 and HCPS Algorithm 2, a particle is a representative entity and a swarm is a cluster of entities. In another embodiment using TATS Algorithm 1 and HCPS Algorithm 2, a particle is an application task and a swarm is a cluster of application tasks. As a result, the service rates of applicable servers 160 for processing arriving application tasks within the GDC 100 are determined.

The following experiments adopted real-life tasks, a price of a grid, and green energy data to evaluate TATS. Parameter settings are described herein.

Figure 2:
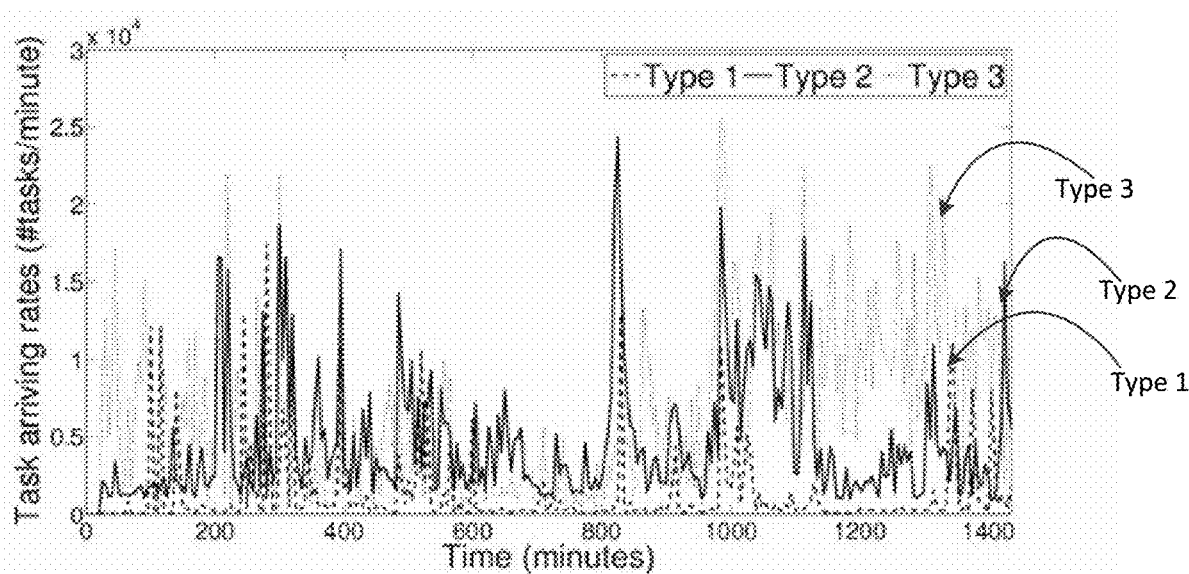
FIG. 2 is a graph illustrating arriving rates for application tasks of type 1, type 2, and type 3 according to one embodiment.
Figure 3:
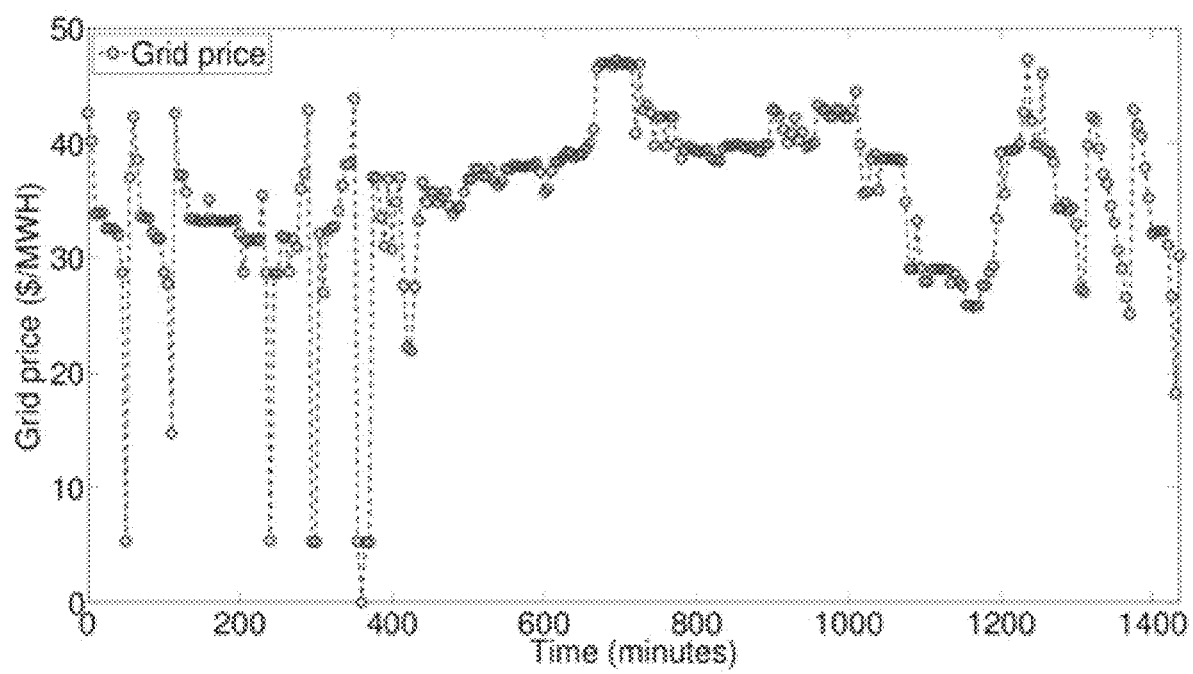
FIG. 3 is a graph illustrating real-life price of grid data over a 24-hour adopted period according to one embodiment.

Public real-life arriving tasks of three applications (types 1, 2, and 3) over approximately a 24-hour period were adopted. FIG. 2 is a graph illustrating the arriving rates for application tasks of type 1, type 2, and type 3. The length of each interval was set to five minutes. Delay bounds of type 1, 2, and 3 applications were respectively 3, 4, and 5 intervals, i.e., $B_1=3$, $B_2=4$, and $B_3=5$. FIG. 3 is a graph illustrating the real-life price of grid data over the 24-hour adopted period. M. Ghamkhari et al. describe energy and performance management of green data centers. See M. Ghamkhari and H. Mohsenian-Rad, "Energy and performance management of green data centers: A profit maximization approach," *IEEE Transactions on Smart Grid*, vol. 4, no. 2, pp. 1017-1025, June 2013, incorporated herein by reference in its entirety. Parameters were set based on Ghamkhari and Mohsenian-Rad for the power consumption model, $\bar{\omega}=5$(MWH), $\bar{P}_0^1=200$(W), $\bar{P}_0^2=100$(W), $\bar{P}_0^3=50$(W), $\bar{P}_1^1=400$(W), $\bar{P}_1^2=200$(W), $\bar{P}_1^3=100$(W), γ=1.2, $\sigma_1=0.05$ tasks/minute, $\sigma_2=0.1$ tasks/minute, and $\sigma_3=0.2$ tasks/minute. In addition, $C_1=12$, $C_2=25$, and $C_3=50$. $\Omega_1=3\times 10^6$, $\Omega_2=1.5\times 10^6$, and $\Omega_3=3\times 10^6$.

The execution time of each task corresponding to each application was sampled based on the uniform distribution over interval (0, L). Based on Yuan et al., VM execution prices per unit time in each interval τ were sampled based on uniform distribution over τ intervals (0.24, 0.48), (0.16, 0.32), and (0.08, 0.16), respectively. See H. Yuan, J. Bi, W. Tan and B. H. Li, "Temporal Task Scheduling With Constrained Service Delay for Profit Maximization in Hybrid Clouds," to appear in *IEEE Transactions on Automation Science and Engineering*, doi: 10.1109/TASE.2016.2526781, incorporated herein by reference in its entirety. $\theta_\tau^n$ was calculated accordingly.

Figure 4:
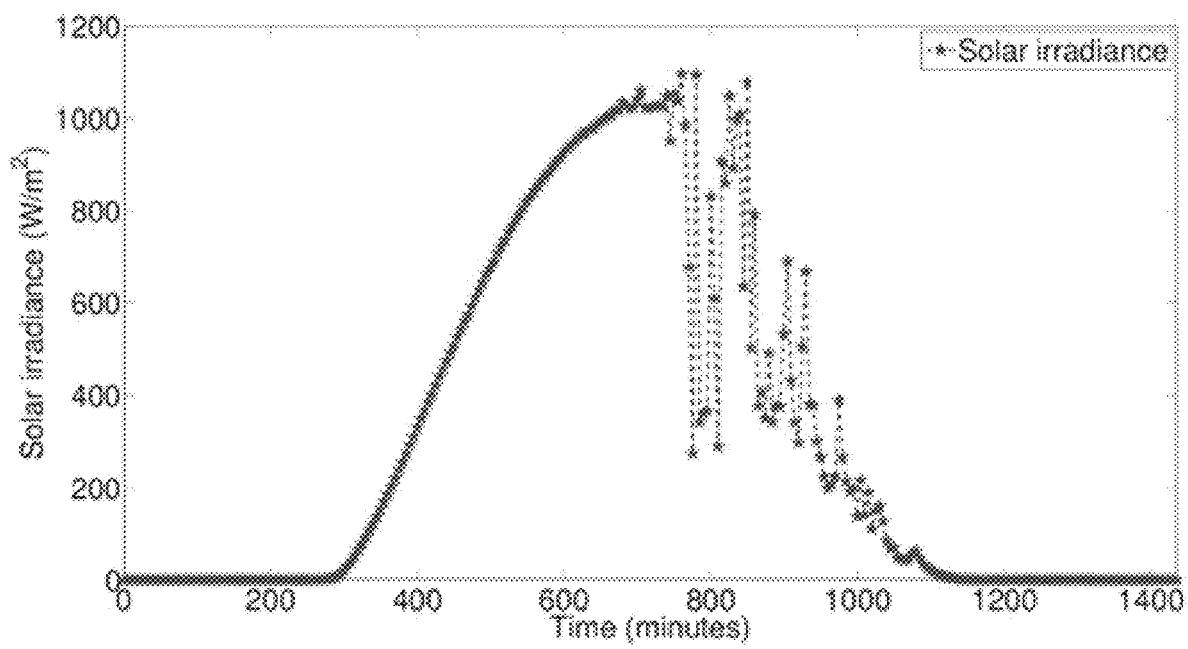
FIG. 4 is a graph illustrating solar irradiance over the 24-hour adopted period according to one embodiment.
Figure 5:
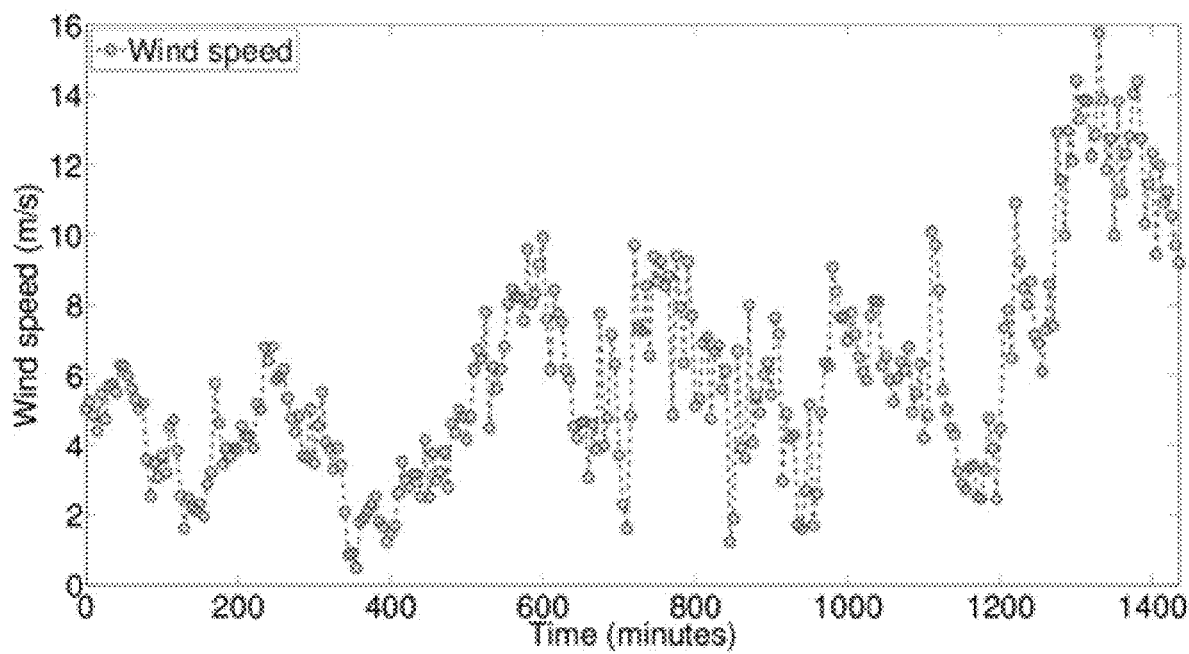
FIG. 5 is a graph illustrating wind speed over the 24-hour adopted period according to one embodiment.

Public data over a 24-hour period were adopted for solar irradiance and for wind speed. FIG. 4 is a graph illustrating the solar irradiance over the 24-hour adopted period. FIG. 5 is a graph illustrating the wind speed over the 24-hour adopted period. In addition, based on Ghamkhari and Mohsenian-Rad, $\kappa=1.5*10^5(m^2)$, $\psi=0.2$, $\rho=1.225(kg/m^3)$, $\zeta=2.5*10^5(m^2)$, and $\eta=0.3$. The power ratings of solar and wind energy sources were set to $1.65*10^8$(W) and $9*10^8$ (W), respectively.

The parameter setting of HCPS in Algorithm 2 is $\omega_M=0.95$, $\omega_m=0.4$, φ=200, ξ=100, k=0.975, $c_1=c_2=0.5$, and $t^0=10^{30}$.

Figure 6:
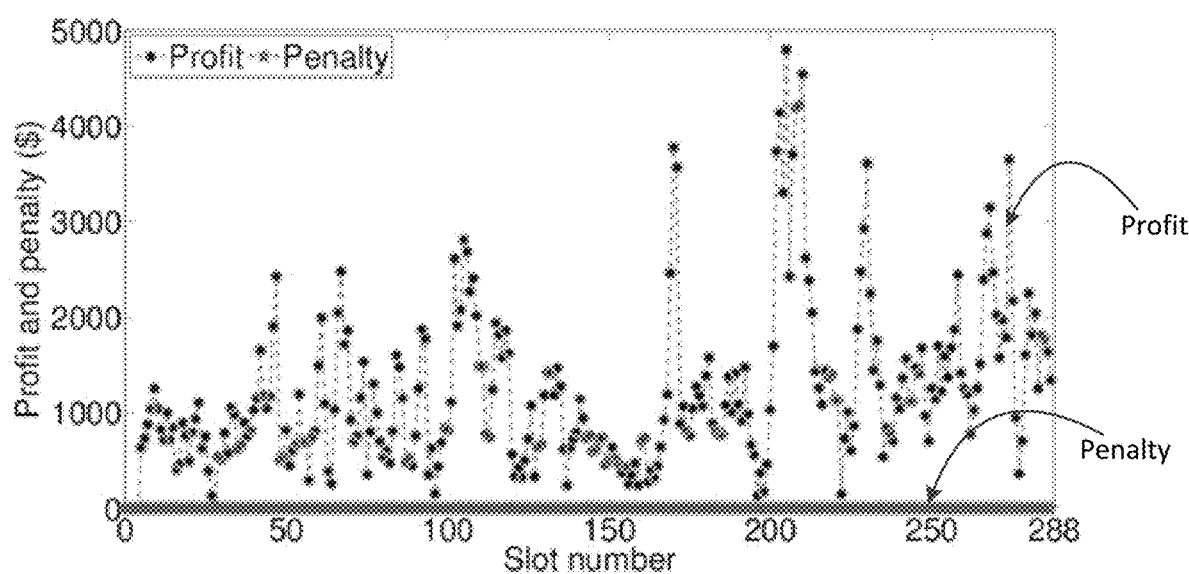
FIG. 6 is a graph illustrating experimental results for a profit and penalty of the GDC according to one embodiment.

FIG. 6 is a graph illustrating experimental results for the profit and penalty of the GDC 100 and the corresponding penalty brought by each solution finally specified by TATS in each interval. In Equation (34), $\zeta=10^{20}$. In Equation (35), α=β=2. It is illustrated in FIG. 6 that the corresponding penalty in each interval τs nearly zero. As shown in Equation (35), the penalty of almost zero shows that TATS can find a close-to-optimal solution that can meet all constraints in $P_1$. In addition, as is shown in Equation (34), TATS can minimize the new objective function $\tilde{f}$, and therefore maximize the profit of the GDC 100.

Figure 7:
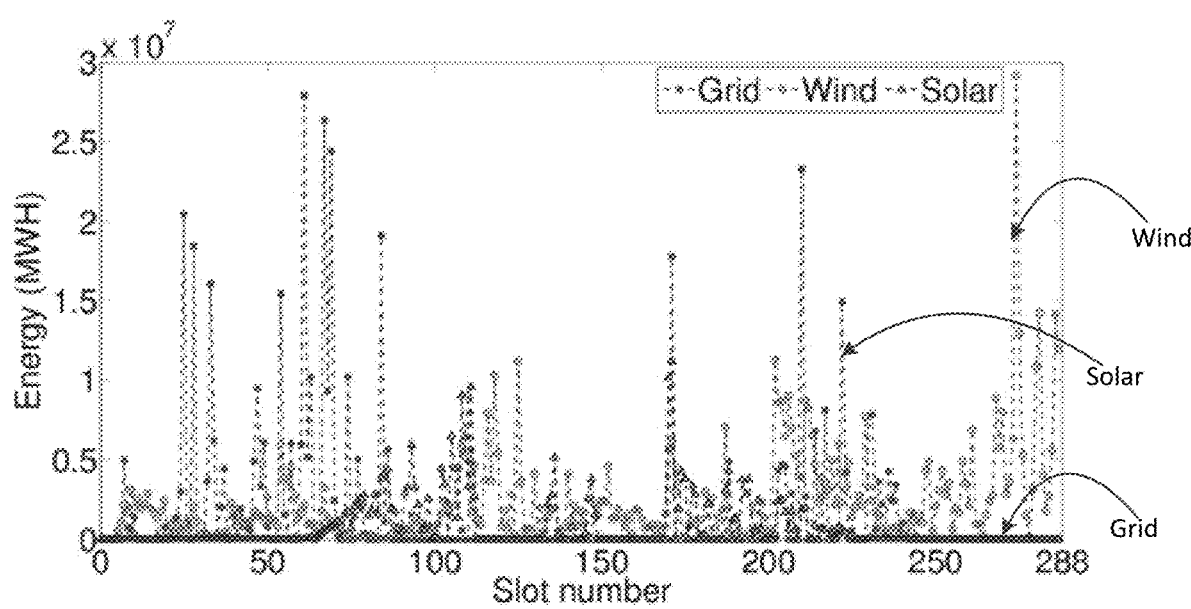
FIG. 7 is a graph illustrating energy from grid, wind, and solar sources according to one embodiment.

The consumption of grid and green energy, including solar and wind, was evaluated. FIG. 7 is a graph illustrating energy from grid, wind, and solar sources. The maximum amount of available energy in the GDC 100 is set to $5\times 10^7$ (MWH), i.e., $\bar{\omega}=5\times 10^7$. TATS is inclined to first use renewable energy generated from solar and wind sources, and then to consume grid energy purchased in each interval. TATS is inclined to use wind energy rather than use solar energy when both of them are available. This is because the power rating of a wind energy source is more than five times higher than the power rating of solar energy. If the sum of wind and solar energy is still not enough, TATS uses grid energy.

Figure 8A:
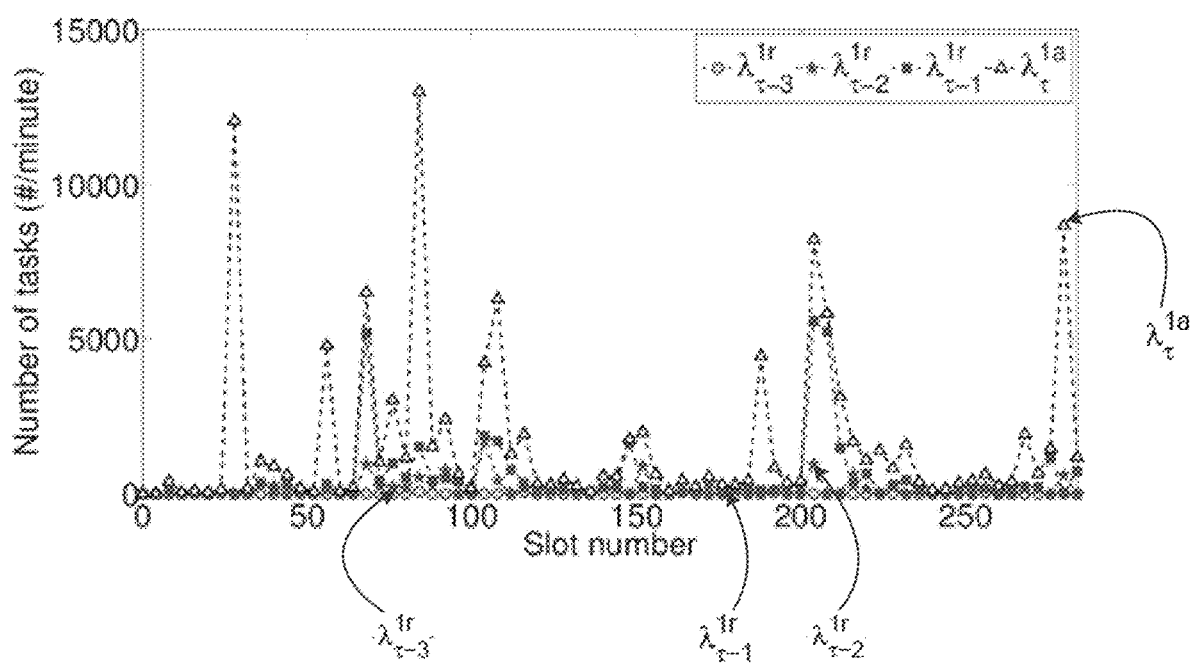
FIG. 8A is a graph illustrating cumulative and remaining tasks of application type 1 according to one embodiment.
Figure 8B:
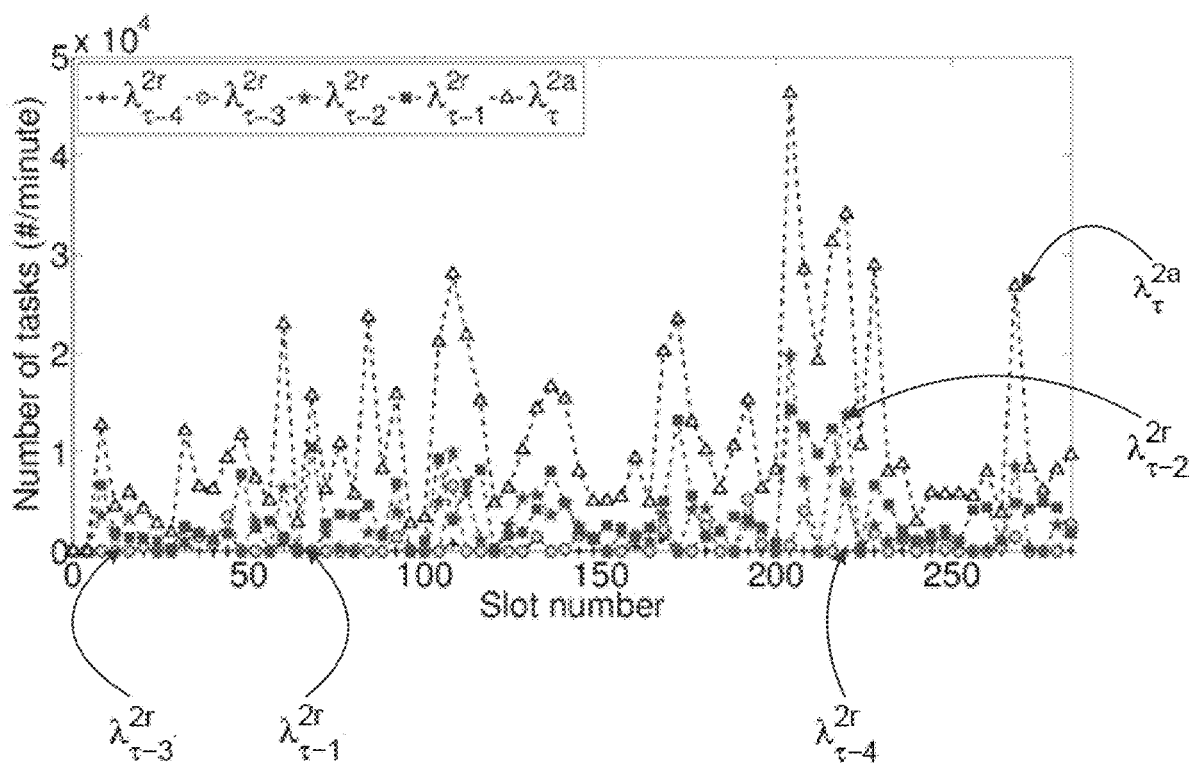
FIG. 8B is a graph illustrating cumulative and remaining tasks of application type 2 according to one embodiment.
Figure 8C:
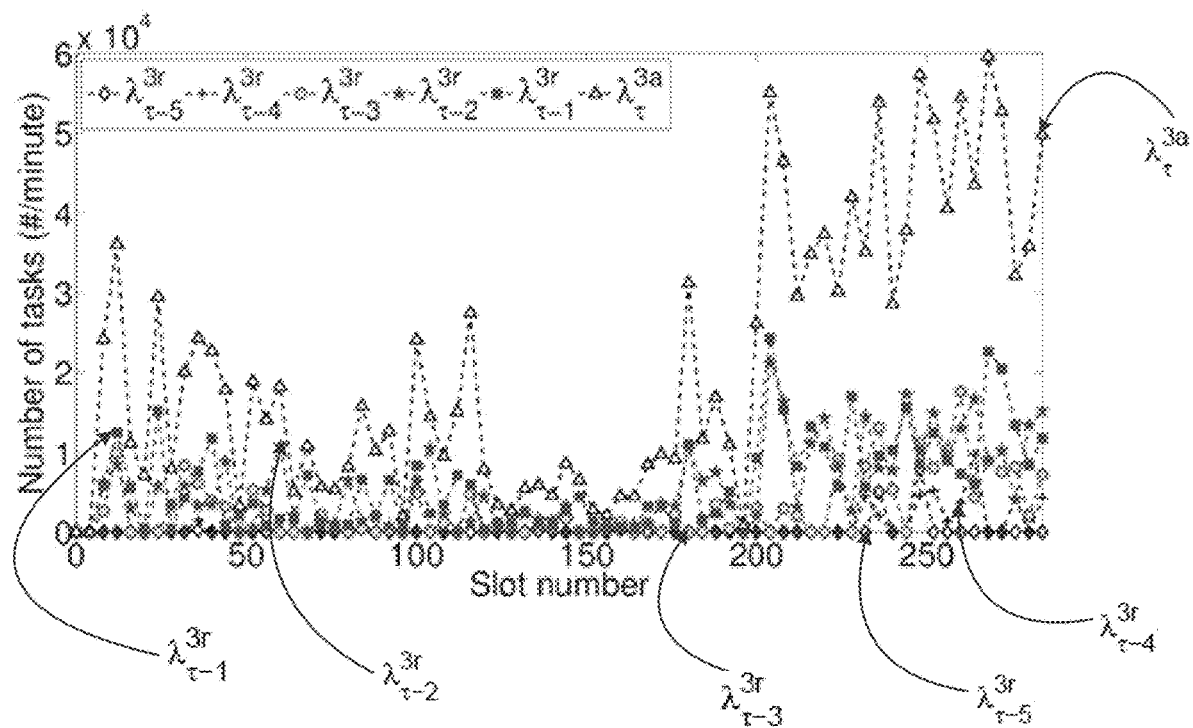
FIG. 8C is a graph illustrating cumulative and remaining tasks of application type 3 according to one embodiment.

In this experiment, the length of each interval was five minutes. FIGS. 8A-8C are graphs illustrating cumulative and remaining tasks of types 1, 2, and 3, respectively in corresponding intervals that were evaluated. For example in FIG. 8B, $\lambda_{\tau-4}^{2r}$, $\lambda_{\tau-3}^{2r}$, $\lambda_{\tau-2}^{2r}$, $\lambda_{\tau-1}^{2r}$, and $\lambda_\tau^{2a}$ correspond to tasks of type 2 in each interval τ, respectively. Note that $\lambda_\tau^{2a}=\lambda_\tau^2+\lambda_{\tau-1}^{2r}+\lambda_{\tau-2}^{2r}+\lambda_{\tau-3}^{2r}+\lambda_{\tau-4}^{2r}$. $\lambda_{\tau-4}^{2r}$ is the smallest among $\lambda_{\tau-4}^{2r}$, $\lambda_{\tau-3}^{2r}$, $\lambda_{\tau-2}^{2r}$, and $\lambda_{\tau-1}^{2r}$. This is because TATS enqueues arriving tasks into their corresponding FCFS queue and inclines to schedule remaining tasks that arrive earlier. TATS attempts to ensure that by interval τ, all tasks in interval $\tau-B_2$ or before are scheduled to the GDC 100. Remaining tasks arriving in intervals τ−3, τ−2, and τ−1 can only be scheduled until $\lambda_{\tau-4}^{2r}=0$. Similarly, $\lambda_{\tau-3}^{2r}$ is smaller than $\lambda_{\tau-2}^{2r}$ and $\lambda_{\tau-1}^{2r}$. Remaining tasks arriving in intervals τ−2 and τ−1 can only be scheduled until $\lambda_{\tau-4}^{2r}=0$ and $\lambda_{\tau-3}^{2r}=0$. Remaining tasks in interval τ−1 are scheduled until all tasks arriving earlier have already been executed, i.e., $\lambda_{\tau-4}^{2r}=0$, $\lambda_{\tau-3}^{2r}=0$ and $\lambda_{\tau-2}^{2r}=0$. Thus, $\lambda_{\tau-1}^{2r}$ is much larger than $\lambda_{\tau-4}^{2r}$, $\lambda_{\tau-3}^{2r}$, and $\lambda_{\tau-2}^{2r}$ in each interval.

Figure 9A:
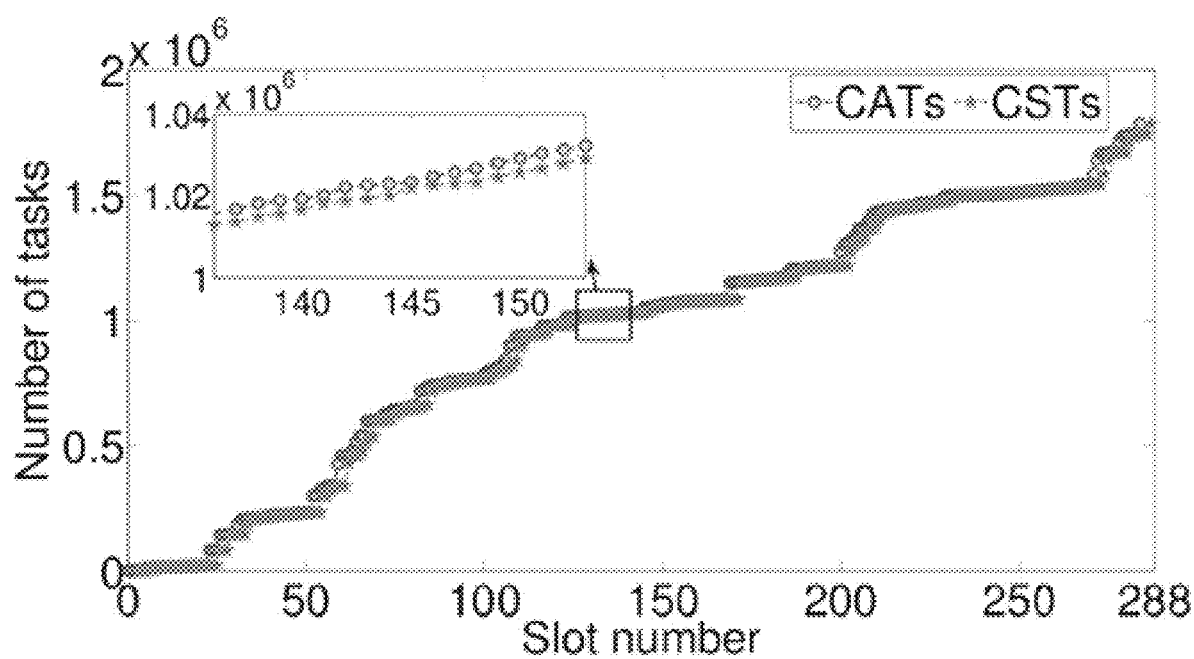
FIG. 9A is a graph illustrating cumulative arriving tasks (CATs) and cumulative scheduled tasks (CSTs) corresponding to application type 1 according to one embodiment.
Figure 9B:
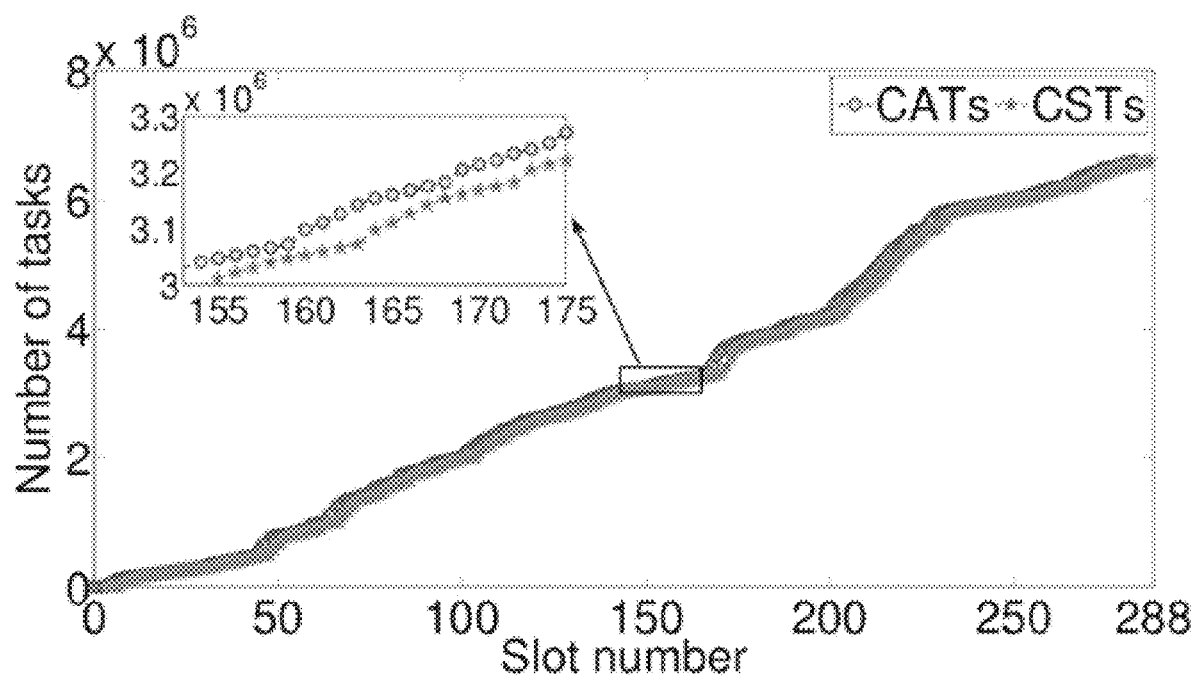
FIG. 9B is a graph illustrating CATs and CSTs corresponding to application type 2 according to one embodiment.
Figure 9C:
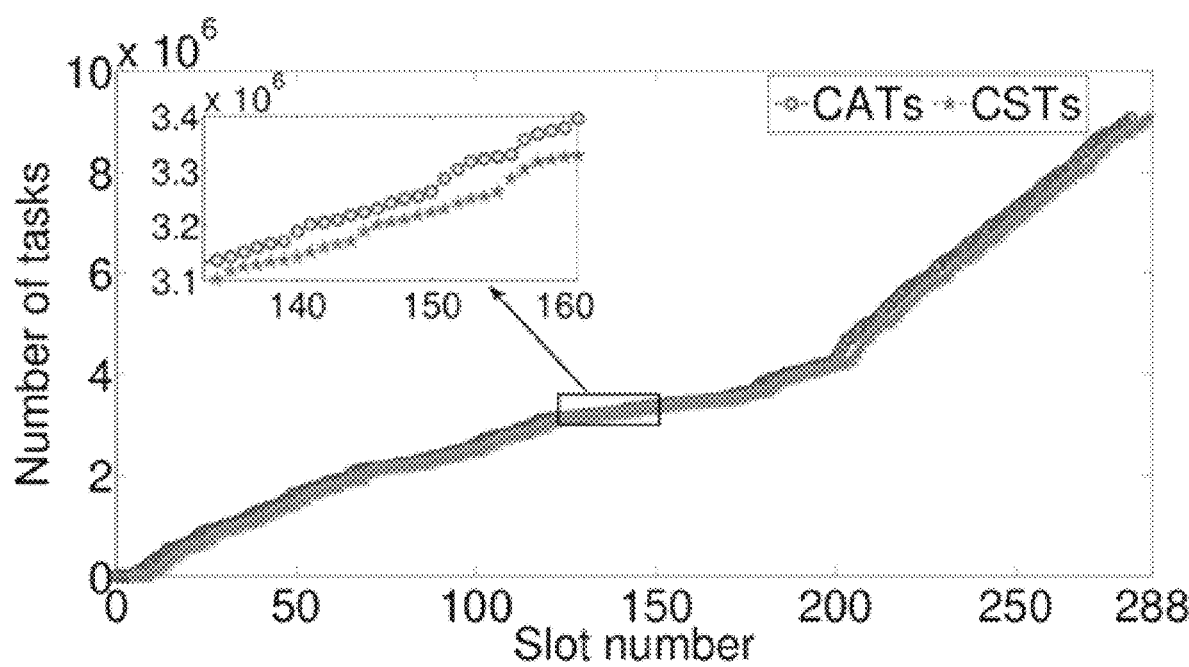
FIG. 9C is a graph illustrating CATs and CSTs corresponding to application type 3 according to one embodiment.

FIGS. 9A-9C are graphs illustrating cumulative arriving tasks (CATs) and cumulative scheduled tasks (CSTs) corresponding to the applications of types 1, 2, and 3, respectively that were evaluated. Similar to Yuan et al. (See H. Yuan, J. Bi, W. Tan, M. Zhou, B. H. Li, and J. Li, "TTSA: An effective scheduling approach for delay bounded tasks in hybrid clouds," to appear in *IEEE Transactions on Cyber-*

*netics*, doi: 10.1109/TCYB.2016.2574766, 2016, incorporated herein by reference in its entirety), delay constraints of the three applications were artificially specified to 3, 4, and 5 intervals, respectively, i.e., Bi=3, $B_2$=4, and $B_3$=5. Tasks of each application were all scheduled to the GDC 100 within their delay bounds. For example in FIG. 9B, the number of CATs in interval 161 is equal to the number of CSTs in interval 165. This indicates tasks of type 2 arriving in interval 161 or before are all scheduled to the GDC 100 by interval 165. Therefore, the experimental result shows that TATS can satisfy the delay constraint of tasks of each application.

The following results can be made when TATS is compared with a number of conventional benchmark algorithms (See X. Deng; D. Wu, J. Shen, and J. He, "Eco-aware online power management and load scheduling for green cloud datacenters," *IEEE Systems Journal*, vol. 10, no. 1, pp. 78-87, March 2016; J. Bi, H. Yuan, W. Tan, and B. H. Li, "TRS: Temporal request scheduling with bounded delay assurance in a green cloud data center," *Information Sciences*, vol. 360, pp. 57-72, April 2016; and X. Zuo, G. Zhang, and W. Tan, "Self-adaptive learning PSO-based deadline constrained task scheduling for hybrid IaaS cloud," *IEEE Transactions on Automation Science and Engineering*, vol. 11, no. 2, pp. 564-573, April 2014, each incorporated herein by reference in their entirety) with respect to the throughput and the profit of the GDC 100.

1) Algorithm 1, similar to cheap-first scheduling algorithm (See X. Deng, D. Wu, J. Shen, and J. He, "Eco-aware online power management and load scheduling for green cloud datacenters," *IEEE Systems Journal*, vol. 10, no. 1, pp. 78-87, March 2016, incorporated herein by reference in its entirety), schedules arriving tasks in a selected interval when the price of the grid is minimal in their corresponding delay bounds. The maximum amount of available energy in the GDC 100 in each interval is fixed and limited. Therefore, some tasks may not be admitted into the GDC 100.

2) Algorithm 2 in (See X. Zuo, G. Zhang, and W. Tan, "Self-adaptive learning PSO-based deadline constrained task scheduling for hybrid IaaS cloud," *IEEE Transactions on Automation Science and Engineering*, vol. 11, no. 2, pp. 564-573, April 2014, incorporated herein by reference in its entirety) ignores the temporal difference in the price of the grid and green energy. Therefore, tasks are scheduled to the GDC 100 in their arriving interval.

3) Algorithm 3, similar to the first scheduling algorithm (See J. Bi, H. Yuan, W. Tan, and B. H. Li, "TRS: Temporal request scheduling with bounded delay assurance in a green cloud data center," *Information Sciences*, vol. 360, pp. 57-72, April 2016, incorporated herein by reference in its entirety), schedules arriving tasks in selected intervals in which the amount of green energy is a maximum in their corresponding delay bounds. Similar to Algorithm 1, some arriving tasks might be refused because of the limit of the maximum amount of available energy in the GDC 100.

Figure 10A:
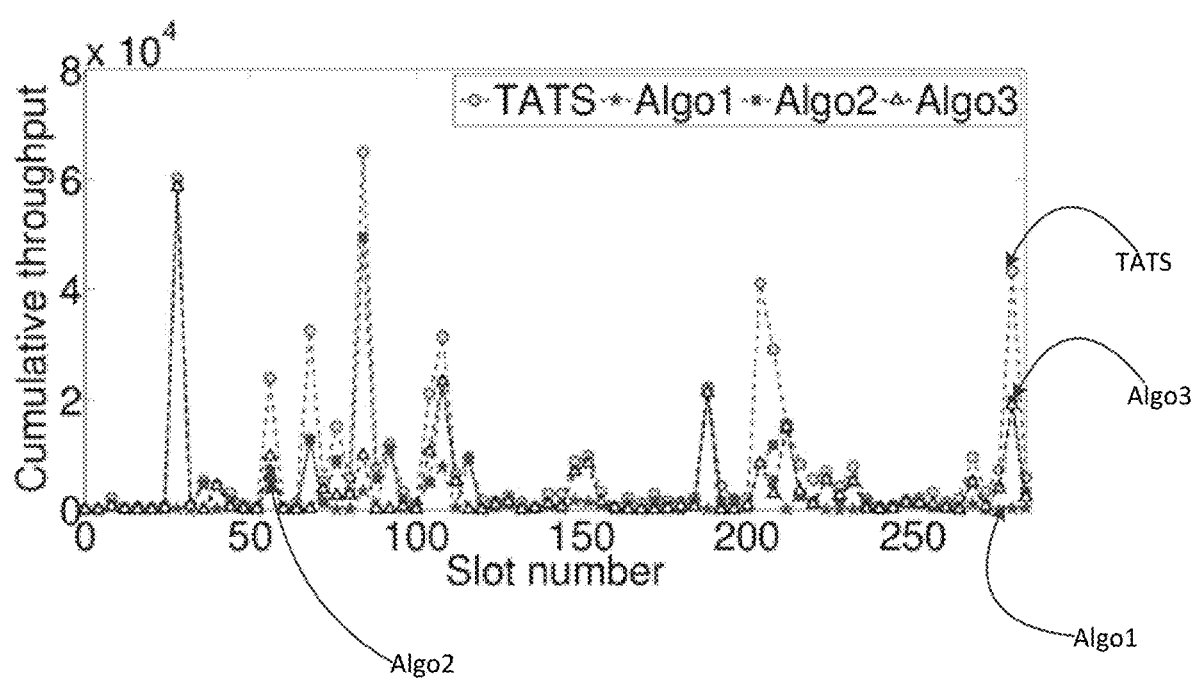
FIG. 10A is a graph illustrating TATS and benchmark Algorithms 1-3 corresponding to application type 1 according to one embodiment.
Figure 10B:
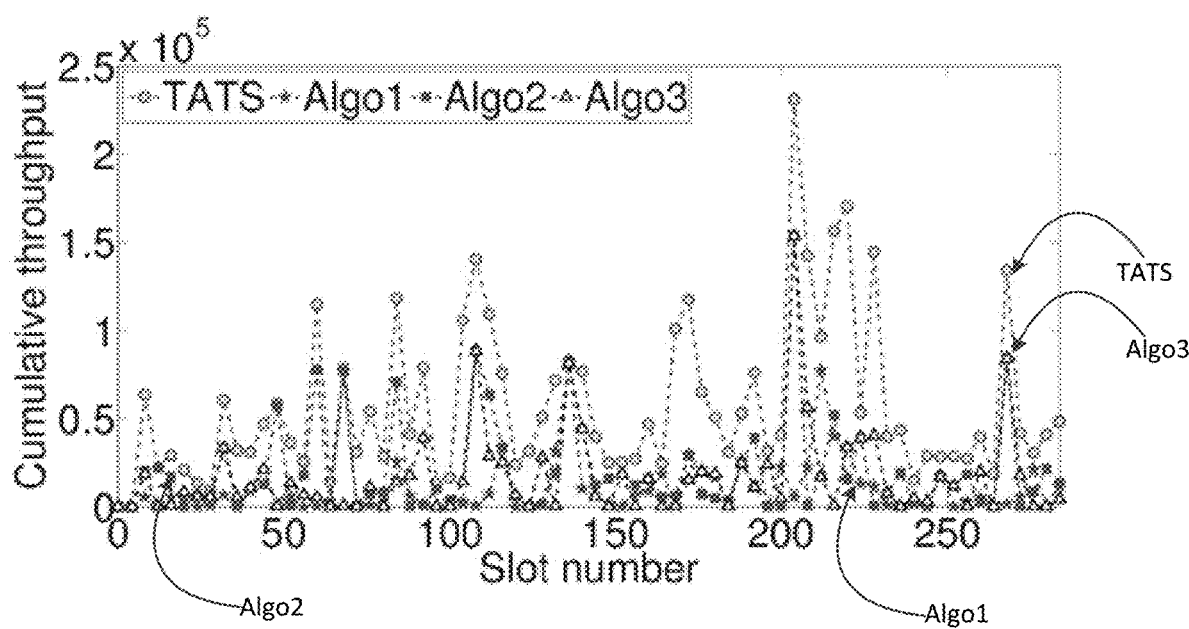
FIG. 10B is a graph illustrating TATS and benchmark Algorithms 1-3 corresponding to application type 2 according to one embodiment.
Figure 10C:
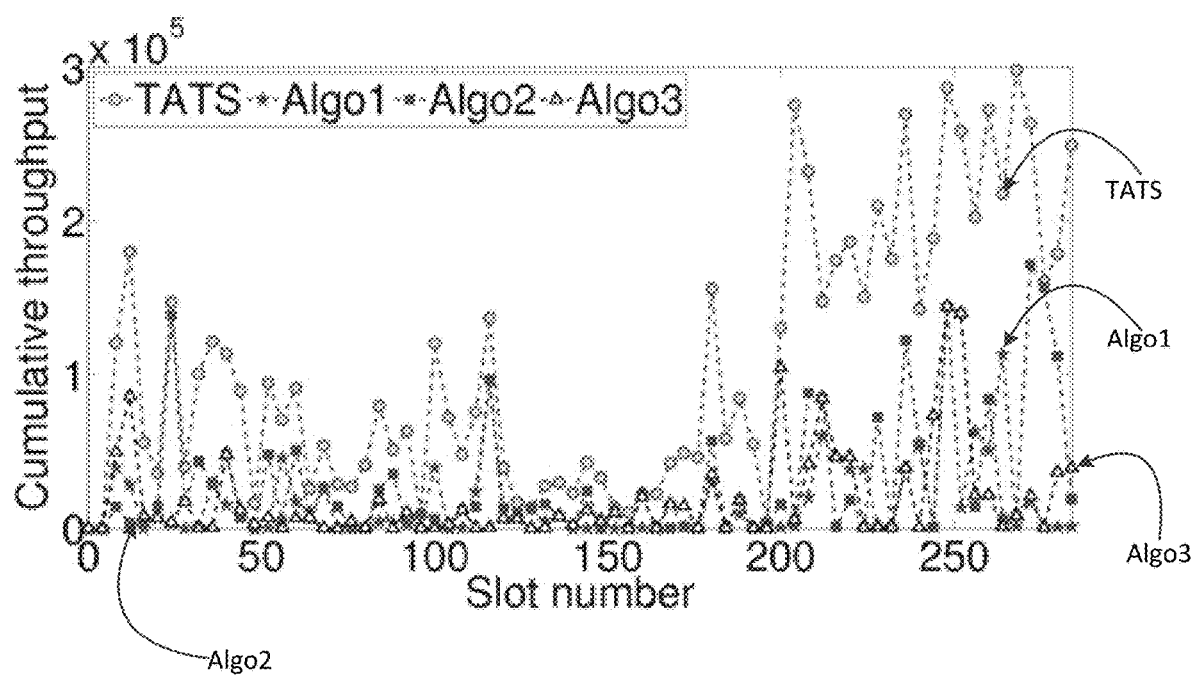
FIG. 10C is a graph illustrating TATS and benchmark Algorithms 1-3 corresponding to application type 3 according to one embodiment.

FIGS. 10A-10C are graphs illustrating TATS and benchmark Algorithms 1-3, corresponding to the applications of types 1, 2, and 3, respectively that were compared. The cumulative throughput in each interval was obtained by calculating the sum of tasks scheduled from t to i+T. For example in FIG. 10B, the cumulative throughput corresponding to type 2 in interval τ was obtained by calculating the sum of tasks scheduled in interval τ to τ+$B_2$. The cumulative throughput of TATS was larger than that of Algorithm 1, Algorithm 2, and Algorithm 3 by 77.4%, 64.3%, and 81% on average, respectively. This is because Algorithm 1, Algorithm 2, and Algorithm 3 all need to selectively admit tasks due to the limited energy in the GDC 100. Therefore, results demonstrate that TATS can effectively increase the cumulative throughput of the GDC 100.

Figure 11:
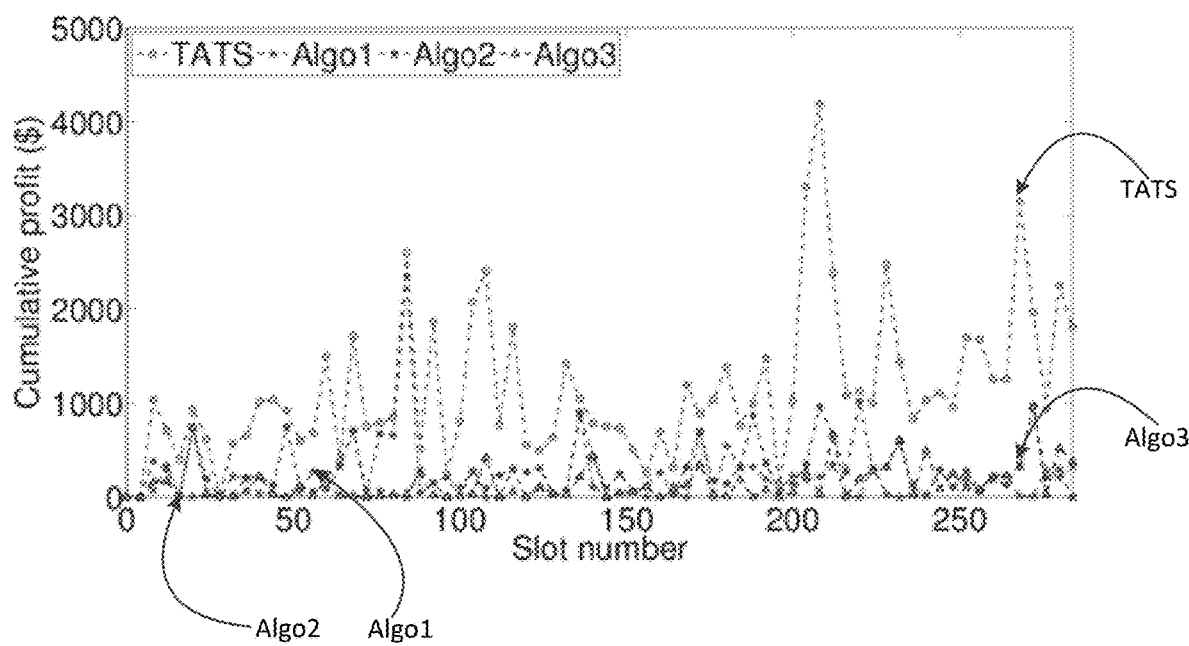
FIG. 11 is a graph illustrating cumulative total profits for TATS that were compared with each of Algorithm 1, Algorithm 2, and Algorithm 3 according to one embodiment.

FIG. 11 is a graph illustrating the cumulative total profits for TATS that were compared with each of Algorithm 1, Algorithm 2, and Algorithm 3. To guarantee the performance of tasks, a conventional SLA that specifies a penalty cost for each refused task is signed between users and cloud providers. See D. Ardagna, B. Panicucci, and M. Passacantando, "Generalized Nash equilibria for the service provisioning problem in cloud systems," *IEEE Transactions on Services Computing*, vol. 6, no. 4, pp. 429-442, October 2013, incorporated herein by reference in its entirety. Therefore, the refused tasks cause the penalty cost for a GDC provider. In conventional SLAs, $v_\tau^n$ is larger than the maximum profit brought by each task of application n from τ to τ+$B_n$. Let YT denote the profit per task of application n in interval τ. Thus, $$v_\tau^n = \max_{i \in \{0, 1, \ldots, B_n\}} (Y_{\tau+i}^n).$$

The cumulative total profit in r is the difference between the profit brought by the execution of tasks and the penalty cost corresponding to refused tasks from interval τ to i+$B_n$. FIG. 11 illustrates that compared with Algorithm 1, Algorithm 2, and Algorithm 3, the cumulative total profit of TATS can be increased significantly. This occurs because TATS can intelligently schedule more arriving tasks to the GDC 100 by investigating the temporal variation in the price of the grid, revenue, and green energy in the delay bounds of tasks.

Each of the functions of the described embodiments can be implemented by one or more processing circuits. A processing circuit includes a programmed processor (for example, the servers 160 or the electronic devices 110 of FIG. 1), which includes circuitry. A processing circuit/circuitry can also include devices such as an application specific integrated circuit (ASIC) and circuit components arranged to perform the recited functions. The processing circuitry can be referred to interchangeably as circuitry throughout the disclosure.

In addition, when processors are programmed to perform the processes described herein, they become special-purpose devices. The processes performed by the electronic devices 110, the queue processors 120, the task scheduling processor 130, the energy collecting processor 150, the servers 160, and the resource provisioning processor 170 have specialized processing circuitry. Incoming delay-bounded tasks are received and queued in the queue processors 120, such that the incoming delay-bounded tasks can be scheduled for processing by the task scheduling processor 130 within the GDC 100.

The specialized processing circuitry of the task scheduling processor 130 receives energy data from the energy collecting processor 150 regarding available energy from renewable energy resources of the solar power source 142 and the wind power source 143. The renewable energy resources are used first and when necessary, resources from the grid power source 141 are used. As a result, the specialized circuitry of processors within the GDC 100 provides a very efficient and ecologically sound computing system.

Figure 12:
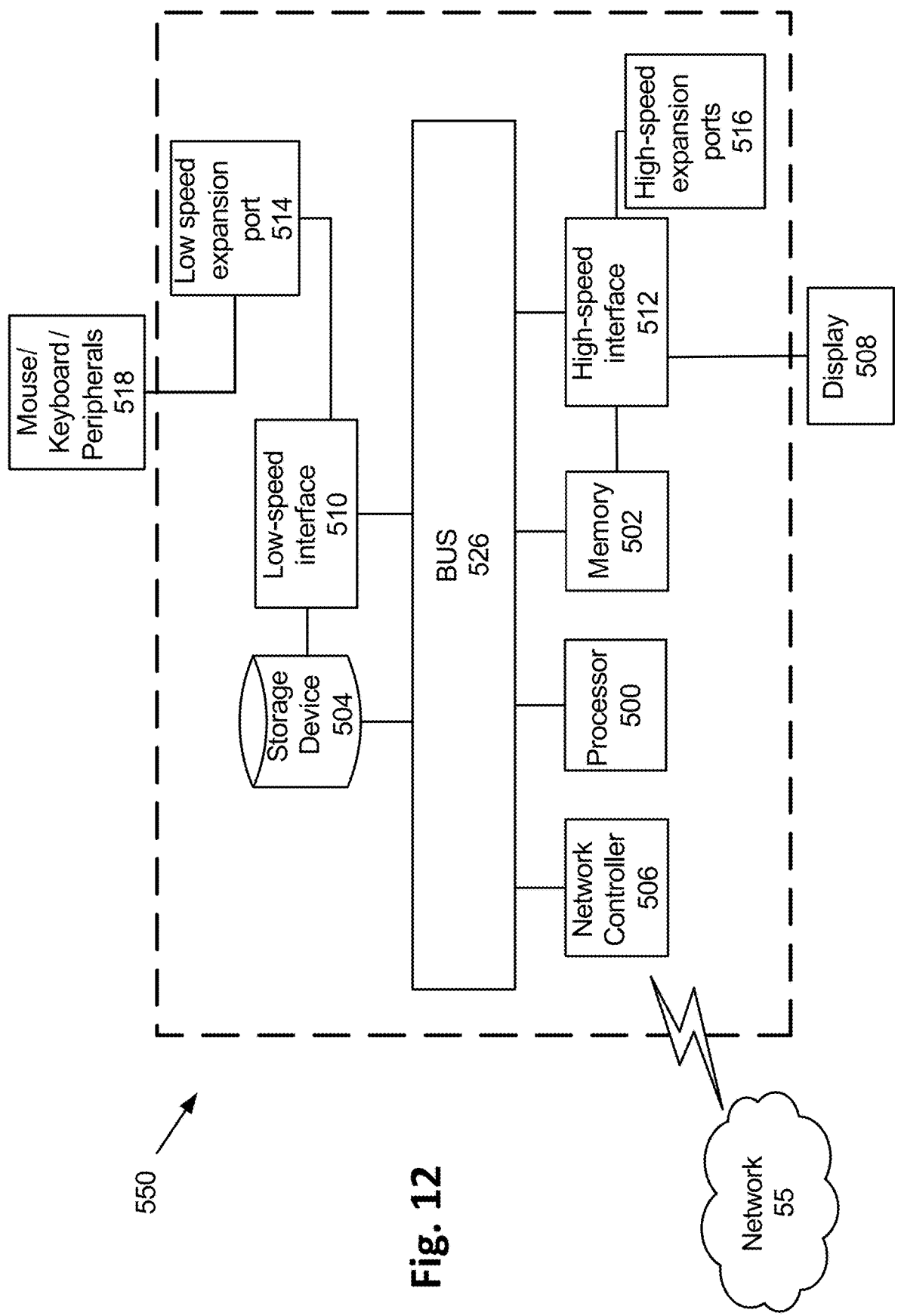
FIG. 12 is a schematic of an exemplary computing device according to one embodiment.

FIG. 12 is a schematic of an exemplary computing device 550, such as the electronic devices 110, the queue processors 120, the task scheduling processor 130, the energy collecting processor 150, the servers 160, and the resource provisioning processor 170, all of which can be used to implement the techniques described in this disclosure. The computing device 550 is intended to represent various forms of digital hardware, such as laptops, desktops, workstations, personal digital assistants, servers, blade servers, mainframes, and other appropriate computers. The components shown here, their connections and relationships, and their functions are meant to be examples only and are not meant to be limiting.

The computing device 550 includes a processor 500, a memory 502, a storage device 504, a high-speed interface 512 connecting to the memory 502 and multiple high-speed expansion ports 516, and a low-speed interface 510 connecting to a low-speed expansion port 514 and the storage device 504. Each of the processor 500, the memory 502, the storage device 504, the high-speed interface 512, the high-speed expansion ports 516, and the low-speed interface 510 are interconnected using various busses, such as communication bus 526, and may be mounted on a common motherboard or in other manners as appropriate.

The processor 500 can process instructions for execution within the computing device 550, including instructions stored in the memory 502 or on the storage device 504 to display graphical information for a GUI on an external input/output device, such as a display 508 coupled to the high-speed interface 512. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system). The memory 502 stores information within the computing device 550. In some implementations, the memory 502 is a volatile memory unit or units. In some implementations, the memory 502 is a non-volatile memory unit or units. The memory 502 can also be another form of computer-readable medium, such as a magnetic or optical disk.

The storage device 504 is capable of providing mass storage for the computing device 550. In some implementations, the storage device 504 can be or contain a computer-readable medium, such as a floppy disk device, a hard disk device, an optical disk device, a tape device, a flash memory or other similar solid state memory device, or an array of devices, including devices in a storage area network or other configurations. Instructions can be stored in an information carrier. The instructions, when executed by one or more processing devices (for example, processor 500), perform one or more methods, such as those described above. The instructions can also be stored by one or more storage devices, such as computer- or machine-readable mediums (for example, the memory 502, the storage device 504, or memory on the processor 500).

The high-speed interface 512 manages bandwidth-intensive operations for the computing device 550, while the low-speed interface 510 manages lower bandwidth-intensive operations. Such allocation of functions is an example only. In some implementations, the high-speed interface 512 is coupled to the memory 502, the display 508 (e.g., through a graphics processor or accelerator), and to the high-speed expansion ports 516, which may accept various expansion cards (not shown). In the implementation, the low-speed interface 510 is coupled to the storage device 504 and the low-speed expansion port 514. The low-speed expansion port 514, which can include various communication ports (e.g., USB, Bluetooth, Ethernet, wireless Ethernet) can be coupled to one or more input/output devices 518, such as a keyboard, a pointing device, a scanner, or a networking device such as a switch or router, e.g., through a network adapter.

The computing device 550 also includes a network controller 506, such as an Intel Ethernet PRO network interface card from Intel Corporation of America, for interfacing with a network 55. As can be appreciated, the network 55 can be a public network, such as the Internet, or a private network such as an LAN or WAN network, or any combination thereof and can also include PSTN or ISDN sub-networks. The network 55 can also be wired, such as an Ethernet network, or can be wireless such as a cellular network including EDGE, 3G and 4G wireless cellular systems. The wireless network can also be Wi-Fi, Bluetooth, or any other wireless form of communication that is known.

Although the computing device of FIG. 12 is described as having a storage medium device 504, the claimed advancements are not limited by the form of the computer-readable media on which the instructions of the described processes are stored. For example, the instructions can be stored on CDs, DVDs, in FLASH memory, RAM, ROM, PROM, EPROM, EEPROM, hard disk, or any other information processing device with which the computing device communicates.

In other alternate embodiments, processing features according to the present disclosure may be implemented and commercialized as hardware, a software solution, or a combination thereof. Moreover, instructions corresponding to processes described herein could be stored in a portable drive, such as a USB Flash drive that hosts a secure process.

Computer programs (also known as programs, software, software applications, or code) associated with the processes described herein include machine instructions for a programmable processor, and can be implemented in a high-level procedural and/or object-oriented programming language, and/or in assembly/machine language. As used herein, the terms machine-readable medium and computer-readable medium refer to any computer program product, apparatus, and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described herein can be implemented on a computer having a display device 508 (e.g., a CRT (cathode ray tube) or LCD (liquid crystal display) monitor) for displaying information to the user and a keyboard and a pointing device 518 (e.g., a mouse or a trackball) by which the user can provide input to the computer. Other kinds of devices can be used to provide for interaction with a user as well. For example, feedback provided to the user can be any form of sensory feedback (e.g., visual feedback, auditory feedback, or tactile feedback), and input from the user can be received in any form, including acoustic, speech, or tactile input.

The systems and techniques described herein can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made without departing from the spirit and scope of this disclosure. For example, preferable results may be achieved if the steps of the disclosed techniques were performed in a different sequence, if components in the disclosed systems were combined in a different manner, or if the components were replaced or supplemented by other components. The functions, processes, and algorithms described herein may be performed in hardware or software executed by hardware, including computer processors and/or programmable circuits configured to execute program code and/or computer instructions to execute the functions, processes, and algorithms described herein. Additionally, an implementation may be performed on modules or hardware not identical to those described. Accordingly, other implementations are within the scope that may be claimed.

Figure 13:
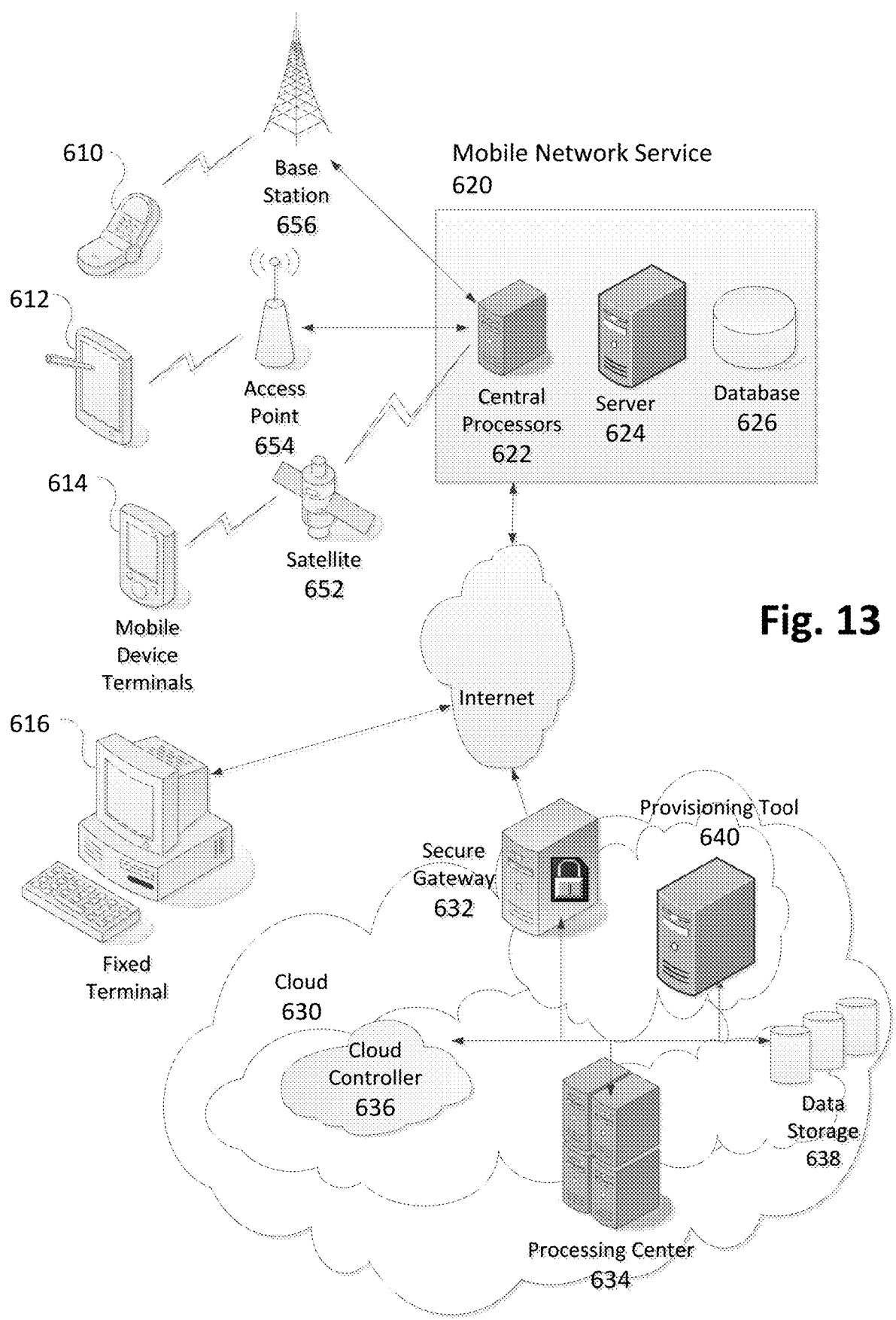
FIG. 13 illustrates an exemplary cloud computing system according to one embodiment.

FIG. 13 illustrates an exemplary cloud computing system, wherein users access the cloud through mobile device terminals or fixed terminals that are connected to the Internet or other network. One or more of the devices illustrated in the GDC 100 of FIG. 1 could be used in the cloud computing system illustrated in FIG. 13.

The mobile device terminals can include a cell phone 610, a tablet computer 612, and a smartphone 614, for example. The mobile device terminals can connect to a mobile network service 620 through a wireless channel such as a base station 656 (e.g., an Edge, 3G, 4G, or LTE Network), an access point 654 (e.g., a femto cell or WiFi network), or a satellite connection 652. In one implementation, signals from the wireless interface to the mobile device terminals (e.g., the base station 656, the access point 654, and the satellite connection 652) are transmitted to a mobile network service 620, such as an EnodeB and radio network controller, UMTS, or HSDPA/HSUPA. Mobile users' requests and information are transmitted to central processors 622 that are connected to servers 624 to provide mobile network services, for example. Further, mobile network operators can provide service to mobile users for authentication, authorization, and accounting based on home agent and subscribers' data stored in databases 626, for example. The subscribers' requests are subsequently delivered to a cloud 630 through the Internet.

A user can also access the cloud 630 through a fixed terminal 616, such as a desktop or laptop computer or workstation that is connected to the Internet via a wired network connection or a wireless network connection. The mobile network service 620 can be a public or a private network such as an LAN or WAN network. The mobile network service 620 can be wireless such as a cellular network including EDGE, 3G and 4G wireless cellular systems. The wireless mobile network service 620 can also be Wi-Fi, Bluetooth, or any other wireless form of communication that is known.

The user's terminal, such as a mobile user terminal and a fixed user terminal, provides a mechanism to connect via the Internet to the cloud 630 and to receive output from the cloud 630, which is communicated and displayed at the user's terminal. In the cloud 630, a cloud controller 636 processes the request to provide users with the corresponding cloud services. These services are provided using the concepts of utility computing, virtualization, and service-oriented architecture.

In one implementation, the cloud 630 is accessed via a user interface such as a secure gateway 632. The secure gateway 632 can for example, provide security policy enforcement points placed between cloud service consumers and cloud service providers to interject enterprise security policies as the cloud-based resources are accessed. Further, the secure gateway 632 can consolidate multiple types of security policy enforcement, including for example, authentication, single sign-on, authorization, security token mapping, encryption, tokenization, logging, alerting, and API control. The cloud 630 can provide to users, computational resources using a system of virtualization, wherein processing and memory requirements can be dynamically allocated and dispersed among a combination of processors and memories to create a virtual machine that is more efficient at utilizing available resources. Virtualization creates an appearance of using a single seamless computer, even though multiple computational resources and memories can be utilized according to increases or decreases in demand. In one implementation, virtualization is achieved using a provisioning tool 640 that prepares and equips the cloud resources, such as the processing center 634 and data storage 638 to provide services to the users of the cloud 630. The processing center 634 can be a computer cluster, a data center, a main frame computer, or a server farm. In one implementation, the processing center 634 and data storage 638 are collocated.

Embodiments described herein can be implemented in conjunction with one or more of the devices described above with reference to FIGS. 12-13. Embodiments described herein are a combination of hardware and software, and circuitry by which the software is implemented.

FIG. 14A is a flowchart illustrating an exemplary method 700 of scheduling tasks. In step S710, a plurality of application tasks are received into one or more processing queues of a GDC. In an embodiment, a plurality of FCFS queues receive the application tasks.

In step S720, a service rate is determined for a plurality of servers to process the plurality of application tasks in the GDC, via processing circuitry. In an embodiment, the task service rate for an application to execute in a time interval $\tau$s calculated, wherein a single task of each application is executed in an individual time interval.

Figure 14B:
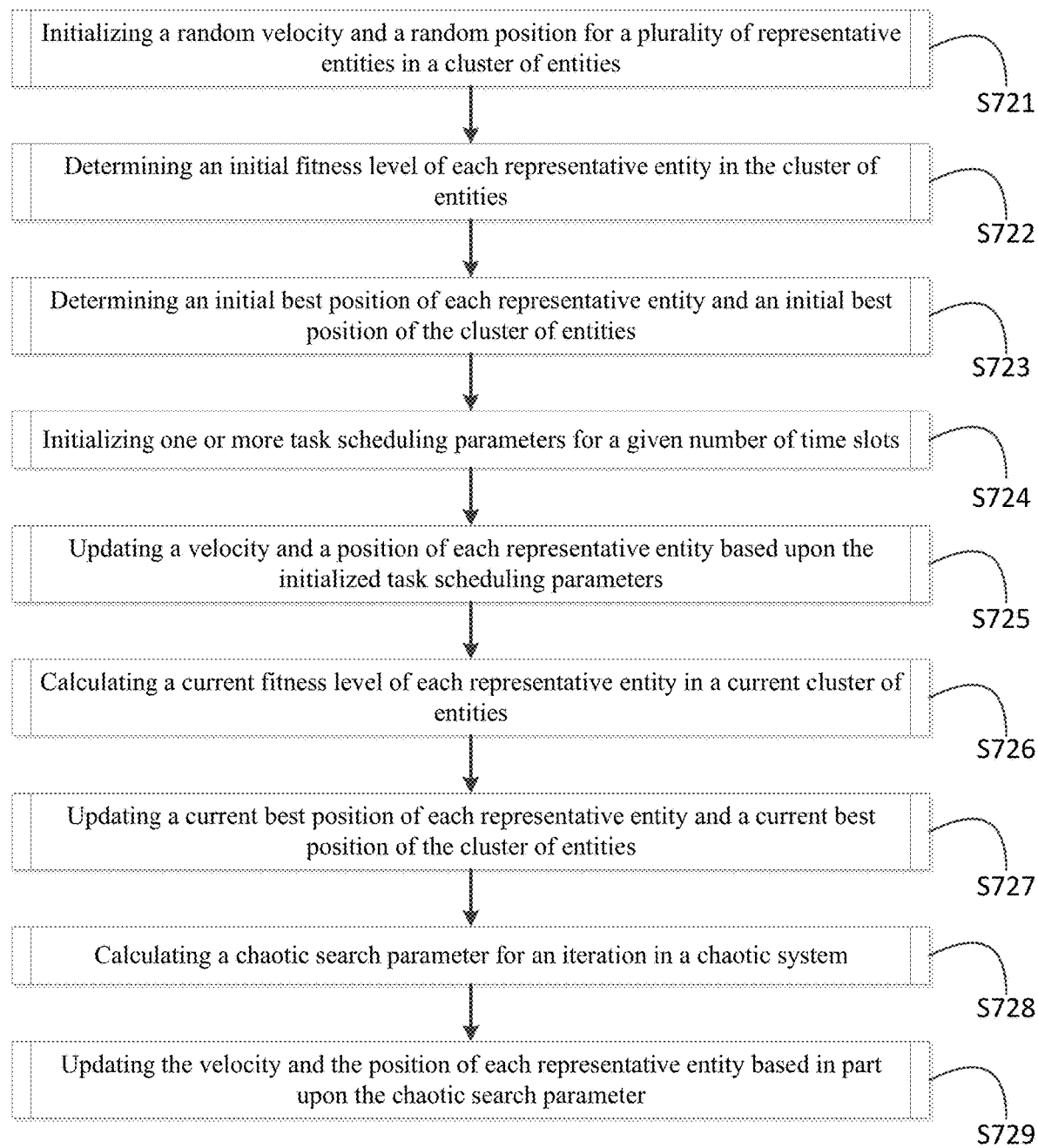

In FIG. 14B, steps S721-S729 are described herein as sub-processing steps for determining the service rate of step S720. In step S721, the velocities and positions of the particles are initialized randomly for a plurality of representative entities in a cluster of entities. In an embodiment, the plurality of representative entities includes a plurality of application tasks, and the cluster of entities includes a cluster of application tasks.

In step S722, an initial fitness level of each representative entity in the cluster of entities is determined. In step S723, an initial best position of each representative entity and an initial best position of the cluster of entities are determined.

In step S724, one or more task scheduling parameters are initialized for a given number of time slots. In an embodiment, the task scheduling parameters include one or more of individual and social acceleration coefficients, a maximum particle velocity, upper and lower bounds of inertia weight, and a temperature cooling rate of each representative entity. In step S725, a velocity and a position of each representative entity are updated based upon the initialized parameters.

In step S726, a current fitness level of each representative entity in a current cluster of entities is calculated. In step S727, a current best position of each representative entity and a current best position of the cluster of entities are updated.

In step S728, a chaotic search parameter in a chaotic system is calculated. In an embodiment, the chaotic search parameter includes a stochastic pattern in the chaotic system.

In step S729, the velocity and the position of each representative entity are updated based upon the chaotic search parameter. In an embodiment, tasks are scheduled to execute in the GDC based upon a difference in an arriving rate of tasks in the respective time interval and a task service rate in the respective time interval.

In FIG. 14A, method 700 also includes scheduling, via the processing circuitry, one or more of the application tasks to be executed in one or more of the servers at a rate according to a difference in an accumulated arriving rate for the plurality of application tasks into the one or more queues and a removal rate for the plurality of application tasks from the one or more queues in step S730. Method 700 also includes removing the one or more application tasks from their associated queues for execution in the scheduled one or more servers in step S740.

In conclusion, the temporal variations in revenue, price of the grid, and green energy make it a challenge to maximize the profit of a GDC provider while strictly satisfying the delay constraint of each admitted task. GDCs attempt to achieve profit maximization by cost-effectively scheduling tasks while meeting their delay constraints.

Several advantages are realized by the described disclosure. Embodiments herein describe a TATS algorithm that can intelligently schedule each admitted task to execute within its delay bounds. The mathematical equations herein describe task refusal and service rates. In each iteration, TATS addresses a profit maximization problem through the disclosed Hybrid Chaotic PSO based on SA. Extensive simulation experiments according to realistic data demonstrate that TATS can effectively improve profit and throughput without exceeding the delay bound of each admitted task, compared with several existing scheduling algorithms.

Some conventional data center systems are powered by different energy sources, including grid power and renewable power. In one conventional example, a management system executes computational tasks by enabling the movement of data components between different data centers. The module of price determination in the management system specifies prices required to execute tasks.

Other conventional data center systems reduce energy and financial costs by adopting techniques to dynamically place computing jobs. For example, different computing jobs can be dynamically placed at multiple data centers. Multiple factors include bandwidth cost to transfer jobs, resource constraints, electricity availability, marginal consumption of electricity, and expected costs. These techniques can reduce the overall cost brought by the execution of computing in multiple data centers.

However, embodiments described herein overcome the deficiencies and shortcomings of many conventional data center systems, such as those described above. Embodiments described herein achieve profit maximization for a GDC provider by considering the temporal variation in the revenue, the price of the grid, and the green energy for delay bounds of each task. Tasks of each application are put into a separate queue, such as a FCFS queue and their delay bound constraints are guaranteed. In addition, the mathematical modeling of task refusal and service rates of tasks are provided. Temporal task scheduling is achieved by solving the formulated profit maximization problem using the hybrid chaotic PSO based on SA algorithm.

Other conventional data center systems include a system to support computing services at multiple response time constraints and energy demands, wherein customers may sacrifice response time performance of some tasks by adopting green products. Another conventional data center system includes an online job and energy scheduling algorithm that attempts to maximize the profit for a GDC using a randomized algorithm and propose to dispatch jobs and energy for the GDC. The expected competitive ratio of the online algorithm in different settings is used to guarantee its performance.

Another conventional data center system has several energy-efficient job scheduling algorithms for both discrete and continuous processor speeds. The energy consumption of a cloud data center can be minimized while sequential tasks within a specified deadline are executed on different servers with discrete and continuous speeds.

Still another conventional data center system focuses on the energy efficiency and sustainability of current Information Communication Technology (ICT) data centers. It uses a unified green ICT framework to integrate multiple features and aspects of software to illustrate the effect of software on energy efficiency in cloud data centers.

However, embodiments described herein overcome the deficiencies and shortcomings of many conventional data center systems, such as those described above. Embodiments described herein focus on tasks with different deadlines corresponding to multiple delay-bounded applications. All delay-bounded tasks are put into a queue, such as a FCFS queue. The mathematical modeling of task refusal and service rates of tasks are presented. The profit of a GDC is maximized by considering the temporal variation in the revenue, the price of the grid, and green energy in delay bounds of each task. The scheduling algorithm described herein can strictly guarantee delay bound constraints of all admitted tasks.

Embodiments described herein include the following aspects.

(1) A method of scheduling tasks includes receiving a plurality of application tasks into one or more queues of a green data center (GDC), and determining a service rate for a plurality of servers to process the plurality of application tasks in the GDC, via processing circuitry. Determining the service rate for the plurality of servers includes initializing, via the processing circuitry, a random velocity and a random position for a plurality of representative application tasks in a cluster of application tasks; determining, via the processing circuitry, an initial fitness level of each representative application task in the cluster of application tasks; determining, via the processing circuitry, an initial optimum position of each representative application task and an initial optimum position of the cluster of application tasks; initializing, via the processing circuitry, one or more task scheduling parameters for a given number of time slots; updating, via the processing circuitry, a velocity and a position of each representative application task based upon the initialized task scheduling parameters; calculating, via the processing circuitry, a current fitness level of each representative application task in a current cluster of application tasks; updating, via the processing circuitry, a current optimum position of each representative application task and a current optimum position of the cluster of application tasks; calculating, via the processing circuitry, a chaotic search parameter for an iteration in a chaotic system; and updating, via the processing circuitry, the velocity and the position of each representative application task based in part upon the chaotic search parameter. The method also includes scheduling, via the processing circuitry, one or more of the application tasks to be executed in one or more of the servers at a rate according to a difference in an accumulated arriving rate for the plurality of application tasks into the one or more queues and a removal rate for the plurality of application tasks from the one or more queues; and removing the one or more application tasks from their associated queues for execution in the scheduled one or more servers.

(2) The method of (1), wherein the task scheduling parameters include one or more of individual and social acceleration coefficients, a maximum particle velocity, upper and lower bounds of inertia weight, and a temperature cooling rate of each representative entity.

(3) The method of either (1) or (2), further includes decreasing a temperature according to the temperature cooling rate; and decreasing the inertia weight of each representative application task from the upper bound inertia weight to the lower bound inertia weight.

(4) The method of any one of (1) through (3), further includes calculating, via the processing circuitry, a maximum percentage of representative application tasks in which the fitness levels are equal within a current cluster of application tasks; and outputting a new best position for the cluster of application tasks.

(5) The method of any one of (1) through (4), further includes calculating, via the processing circuitry, a task service rate for an application to execute in a time interval within the GDC, wherein a single task of each application is executed in an individual time interval; and updating, via the processing circuitry, the data task variables for all executed tasks.

(6) The method of any one of (1) through (5), further includes scheduling the application tasks, via the processing circuitry, to execute in the GDC based upon a difference in an arriving rate of the application tasks in the respective time interval and an application task service rate in the respective time interval.

(7) The method of any one of (1) through (6), wherein the GDC includes energy resources from a grid power source and a renewable energy source.

(8) The method of any one of (1) through (7), wherein the renewable energy source includes one or more of a solar energy source and a wind energy source.

(9) The method of any one of (1) through (8), wherein the chaotic search parameter includes a stochastic pattern in the chaotic system.

(10) The method of any one of (1) through (9), wherein the method includes a combination of hybrid chaotic particle swarm optimization based on simulated annealing.

(11) A task scheduling system includes a plurality of queue processors configured to receive a plurality of application tasks into the task scheduling system, a plurality of servers configured to process the plurality of application tasks, and processing circuitry configured to determine a task service rate for each of the servers to schedule the plurality of application tasks received from the plurality of queue processors at a rate according to a difference in an accumulated arriving rate into the plurality of queue processors and a removal rate from the plurality of queue processors. The processing circuitry is further configured to initialize a random velocity and a random position for a plurality of representative application tasks in a cluster of application tasks, determine an initial fitness level of each representative application task in the cluster of application tasks, determine an initial optimum position of each representative application task and an initial optimum position of the cluster of application tasks, initialize one or more task scheduling parameters for a given number of time slots, update a velocity and a position of each representative application task based upon the initialized task scheduling parameters, calculate a current fitness level of each representative application task in a current cluster of application tasks, update a current optimum position of each representative application task and a current optimum position of the cluster of application tasks, calculate a chaotic search parameter for an iteration in a chaotic system, and update the velocity and the position of each representative application task based in part upon the chaotic search parameter.

(12) The task scheduling system of (11), further includes an energy collecting processor having circuitry configured to forward resource data from a grid power source and from one or more renewable power sources to the plurality of servers and to a task scheduling processor.

(13) The task scheduling system of either (11) or (12), wherein the task scheduling processor has circuitry configured to receive data from the plurality of queue processors and from the energy collecting processor to determine the service rate of each of the servers.

(14) The task scheduling system of any one of (11) through (13), wherein the resource data includes one or more of a price of the grid power source, a solar irradiance, a wind speed, an on-site air density, and an average idle peak power for each of the servers.

(15) The task scheduling system of any one of (11) through (14), wherein the processing circuitry is further configured to calculate a task service rate for one of the application tasks to execute in a time interval within the task scheduling system, wherein a single task of each application task is executed in an individual time interval, and update the data task variables for all executed tasks.

(16) The task scheduling system of any one of (11) through (15), wherein determining the task service rate includes a combination of hybrid chaotic particle swarm optimization based on simulated annealing.

(17) The task scheduling system of any one of (11) through (16), wherein the chaotic search parameter includes a stochastic pattern in the chaotic system.

(18) A non-transitory computer-readable medium having computer-executable instructions embodied thereon that when executed by a computing device, perform a method of scheduling tasks. The method includes receiving a plurality of application tasks into one or more queues of a green data center (GDC), and determining a service rate for a plurality of servers to process the plurality of application tasks in the GDC. Determining the service rate for the plurality of servers includes initializing a random velocity and a random position for a plurality of representative application tasks in a cluster of application tasks, determining an initial fitness level of each representative application task in the cluster of application tasks, determining an initial optimum position of each representative application task and an initial optimum position of the cluster of application tasks, initializing one or more task scheduling parameters for a given number of time slots, updating a velocity and a position of each representative application task based upon the initialized task scheduling parameters, calculating a current fitness level of each representative application task in a current cluster of application tasks, updating a current optimum position of each representative application task and a current optimum position of the cluster of application tasks, calculating a chaotic search parameter in a chaotic system, and updating the velocity and the position of each representative application task based upon the chaotic search parameter. The method also includes scheduling one or more of the application tasks to be executed in one or more of the servers at a rate according to a difference in an accumulated arriving rate for the plurality of application tasks into the one or more queues and a removal rate for the plurality of application tasks from the one or more queues, and removing the one or more application tasks from their associated queues for execution in the scheduled one or more servers.

A number of implementations have been described. Nevertheless, it will be understood that various modifications may be made without departing from the spirit and scope of this disclosure. For example, preferable results may be achieved if the steps of the disclosed techniques were performed in a different sequence, if components in the disclosed systems were combined in a different manner, or if the components were replaced or supplemented by other components. The functions, processes, and algorithms described herein may be performed in hardware or software executed by hardware, including computer processors and/or programmable circuits configured to execute program code and/or computer instructions to execute the functions, processes, and algorithms described herein. Additionally, an implementation may be performed on modules or hardware not identical to those described. Accordingly, other implementations are within the scope that may be claimed.

The foregoing discussion describes merely exemplary embodiments of the present disclosure. As will be understood by those skilled in the art, the present disclosure may be embodied in other specific forms without departing from the spirit or essential characteristics thereof. Accordingly, the disclosure is intended to be illustrative, but not limiting of the scope of the disclosure, as well as the claims. The disclosure, including any readily discernible variants of the teachings herein, defines in part, the scope of the foregoing claim terminology such that no inventive subject matter is dedicated to the public.

The invention claimed is:

1. A time-aware application task scheduling system for a green data center (GDC), the GDC having a task scheduling processor coupled to one or more queue processors and an energy collecting processor connected to one or more renewable energy sources and a grid power source, wherein the task scheduling processor is configured to periodically receive energy data from the energy collecting processor, regarding available energy from renewable energy resources, wherein the resources of the renewable energy source are used first and then-when necessary, resources from the grid power source are used, and wherein the one or more queue processors are configured to receive a plurality of application tasks from a plurality of electronic devices into the one or more queue processors of the application task scheduling system, per application, of the GDC, the time-aware application task scheduling system, comprising:

a plurality of servers configured to process the plurality of application tasks; and the task scheduling processor configured to:

determine a task service rate for each of the plurality of servers to schedule the plurality of application tasks received from the plurality of electronic devices, each of said task service rate being determined according to a difference in an accumulated arriving rate for the plurality of application tasks in a respective time interval into the one or more queue processors and a removal rate for the plurality of application tasks in the respective time interval for removing immediately a batch of $L(1-\delta(\lambda_\tau^{na},\mu_\tau^{n}))\lambda_\tau^{na}$ application tasks from their associated queue processors for execution in the scheduled one or more servers, the number of the application tasks scheduled being based on the determined task service rate for the plurality of servers and the accumulated arriving rate into the one or more queue processors using a particle swarm optimization technique and a simulated annealing technique that solves a formulated novel profit maximization problem for a GDC, the profit maximization problem is derived with an $M/M/1/C_n/\infty$ queueing system, the task service rate representing a rate at which the application tasks are removed from the one or more queue processors and executed, the task scheduling processor further configured to:

initialize a random velocity and a random position for a plurality of representative application tasks in a cluster of application tasks representing an initial swarm for the service rate, determine an initial fitness level of each representative application task in the cluster of application tasks, the initial fitness level representing a profit of the green data center based on a total revenue of the GDC for the initial swarm, an energy cost of the GDC, and a penalty associated with violated constraints, determine an initial optimum position of each representative application task and an initial optimum position of the cluster of application tasks, the position of each of the application tasks, which is represented by a particle, contains decision variables including $\mu_\tau^{n}$ and $\mu_{\tau+b}^{n}$, initialize one or more predetermined task scheduling parameters associated with the particle swarm optimization technique, update a velocity and a position of each representative application task based upon the initialized task scheduling parameters using a Metropolis acceptance criterion, and based upon the initialized task scheduling parameters associated with the chaotic system, wherein said updating includes, for each said application task, if a new position of the application task is better than a current position thereof, the new position is accepted, otherwise, the new position is conditionally accepted only if the Metropolis acceptance criterion is met, calculate a current fitness level of each representative application task in a current cluster of application tasks, update a current optimum position of each representative application task and a current optimum position of the cluster of application tasks, decrease a temperature by a temperature cooling rate of each representative application task and an inertia weight of each representative application task from an upper bound inertia weight to a lower bound inertia weight, calculate a chaotic search parameter for an iteration in a chaotic system, the chaotic search parameter being distributed between zero and one, update the velocity and the position of each representative application task based in part upon the chaotic search parameter, and determine the task service rate for the plurality of servers based on the updated velocity and the updated position of each representative application task, the updated position including $\mu_\tau^n$ and $\tilde{\mu}_{\tau+b}^n$, schedule, via the task scheduling processor, one or more of the plurality of application tasks to be executed in one or more of the plurality of servers at a rate determined according to a difference in an accumulated arriving rate for the one or more application tasks into the one or more queue processors and a removal rate for the one or more application tasks from the one or more queue processors, the number of the one or more application tasks scheduled being based on the determined task service rate for the plurality of servers and the accumulated arriving rate for the plurality of application tasks into the one or more queue processors, and a batch of $L(1-\delta(\lambda_\tau^{na},\mu_\tau^n))\lambda_\tau^{na}$ tasks being immediately scheduled and executed in plurality of servers in the GDC; and remove immediately the batch of $L(1-\delta(\lambda_\tau^{na},\mu_\tau^n))\lambda_\tau^{na}$ application tasks from their associated queue processors for execution in the scheduled one or more servers, wherein the one or more application tasks are scheduled to maximize a profit in the GDC while guaranteeing delay constraints of each application, wherein each application task is constrained by the following equations:

$$\Lambda_{\tau-B_n-1}^n + \lambda_{\tau-B_n}^n L \le D_{\tau-1}^n + (\lambda_\tau^{na}(1-\delta(\lambda_\tau^{na},\mu_\tau^n))L) \quad (5)$$

$$\Lambda_{\tau-B_n-1}^n + \sum_{u=\tau-B_n}^{\tau-B_n+b}(\lambda_u^n L) \le D_{\tau-1}^n + (\lambda_\tau^{na}(1-\delta(\lambda_\tau^{na},\mu_\tau^n))L) + \sum_{u=\tau+1}^{\tau+b}(\tilde{\lambda}_u^{na}(1-\delta(\tilde{\lambda}_u^{na},\tilde{\mu}_u^n))L), 1 \le b \le B_n, \text{ and} \quad (6)$$

$$\Lambda_{\tau-B_n-1}^n + \sum_{u=\tau-B_n}^{\tau}|(\lambda_u^n L) = D_{\tau-1}^n + (\lambda_\tau^{na}(1-\delta(\lambda_\tau^{na},\mu_\tau^n))L) + \sum_{u=\tau+1}^{\tau+B_n}(\tilde{\lambda}_u^{na}(1-\delta(\tilde{\lambda}_u^{na},\tilde{\mu}_u^n))L), \quad (9)$$

where $\Lambda_\tau^n$ is the number of already-arrived tasks, $B_n$ is the delay constraint, $\mu_\tau^n$ is the arriving rate of its task in a time interval $\tau$, L is length of each interval, $D_\tau^n$ is number of tasks scheduled in $\tau$ intervals, $\lambda_\tau^{na}$ is the accumulated arriving rate of tasks of application n in interval $\tau$, $\mu_\tau^n$ is the rate at which tasks of application n are removed from the queue, $\delta(\lambda_\tau^{na},\mu_\tau^n)$ is the loss possibility of tasks of application n in interval $\tau$, and b is a time interval ($1 \le b \le B_n$), wherein the servers associated with each said application task are homogeneous, and wherein the servers across the application tasks are heterogeneous.

2. The task scheduling system of claim 1, further comprising:

an energy collecting processor having circuitry configured to forward resource data from a grid power source and from the one or more renewable power sources to the plurality of servers and to a task scheduling processor.

3. The task scheduling system of claim 2, wherein the $L(1-\delta(\lambda_\tau^{na},\mu_\tau^n))\lambda_\tau^{na}$ task scheduling processor has circuitry configured to receive data from the one or more queue processors and from the energy collecting processor to determine the task service rate, $\mu_\tau^n$ of each of the servers, and a batch of tasks are immediately scheduled and executed in servers in GDC.

4. The task scheduling system of claim 2, wherein the resource data includes one or more of a price of the grid power source, a solar irradiance, a wind speed, an on-site air density, and an average idle peak power for each of the servers.

5. The task scheduling system of claim 1, wherein the processing circuitry is further configured to solve the formulated novel profit maximization problem for a GDC, the problem is derived with an M/M/1/$C_n$/$\infty$ queueing system, calculate a task service rate for one of the application tasks to execute in a time interval within the task scheduling system, wherein a batch of $L(1-\delta(\lambda_\tau^{na},\mu_\tau^n))\lambda_\tau^{na}$ tasks are immediately scheduled and executed in the servers in the GDC in an individual time interval; and update the data task variables for all executed tasks.

6. The task scheduling system of claim 1, wherein determining the task service rate includes a combination of hybrid chaotic particle swarm optimization based on simulated annealing, where the chaotic search parameter is used in the update of velocity of each particle.

7. The task scheduling system of claim 1, wherein the chaotic search parameter, which is used to update the velocity of each particle, includes a stochastic pattern in the chaotic system.

* * * * *